United States Patent
Relyea et al.

(10) Patent No.: US 7,044,569 B1
(45) Date of Patent: *May 16, 2006

(54) MODULAR DRAWER SYSTEM

(75) Inventors: Christopher M. Relyea, Columbus, OH (US); Michael S. Relyea, Grove City, OH (US); Mark A. Relyea, Westerville, OH (US); Kristen K. Hestrom, Grove City, OH (US); Frank R. Wilgus, Powell, OH (US); Donald J. Staufenberg, Dublin, OH (US); Gary L. Claypoole, Cincinnati, OH (US)

(73) Assignee: Artromick International, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,021

(22) Filed: May 15, 2000

Related U.S. Application Data

(63) Continuation of application No. 08/743,619, filed on Nov. 4, 1996.

(51) Int. Cl.
*A47B 97/00* (2006.01)

(52) U.S. Cl. .................. 312/249.11; 280/79.3; 280/47.35; 312/218; 312/234.5; 312/348.3; 312/348.6; 312/291; 312/265.3

(58) Field of Classification Search ........... 280/79.2, 280/79.3, 47.35, 47.371, 47.34; 16/35 R; 312/209, 281, 249.1, 249.8, 249.12, 249.11, 312/249.13, 217, 218, 219, 265.1, 265.2, 312/265.3, 234.5, 348.3, 348.6, 251, 301

See application file for complete search history.

(56) References Cited

U.S. PATENT DOCUMENTS

| | | | | |
|---|---|---|---|---|
| 3,318,646 A | * | 5/1967 | Ibel | 312/218 |
| 3,379,190 A | * | 4/1968 | Leach | 126/25 R |
| 4,010,989 A | * | 3/1977 | Klug | 312/204 |
| 4,021,072 A | * | 5/1977 | Belanger | |
| 4,276,962 A | * | 7/1981 | Aulik | 16/35 R |
| 4,316,547 A | * | 2/1982 | Varon | 211/105.1 |
| 4,331,369 A | * | 5/1982 | Lazar et al. | 312/334.8 X |
| 4,616,890 A | * | 10/1986 | Romick | 312/216 X |
| 4,640,200 A | * | 2/1987 | Richardson | |
| 4,720,016 A | * | 1/1988 | Kay | 211/96 |
| 4,822,116 A | * | 4/1989 | Relyea et al. | |
| 4,941,552 A | * | 7/1990 | Screen | 16/35 R |
| 5,011,240 A | * | 4/1991 | Kelley et al. | |
| 5,058,911 A | * | 10/1991 | Hunter et al. | 280/47.35 |
| 5,191,675 A | * | 3/1993 | Ishikura | |
| 5,322,365 A | * | 6/1994 | Teufel et al. | 312/249.11 X |
| 5,590,939 A | * | 1/1997 | Piontek | 312/263 |
| 5,673,983 A | * | 10/1997 | Carlson et al. | |
| 5,730,511 A | * | 3/1998 | Doan et al. | 312/234.4 |
| 6,550,880 B1 | * | 4/2003 | Reuter | 312/265.3 |
| 2002/0067108 A1 | * | 6/2002 | Doan et al. | 312/204 |

* cited by examiner

*Primary Examiner*—Janet M. Wilkens
(74) *Attorney, Agent, or Firm*—Wood, Herron & Evans, LLP

(57) ABSTRACT

A modular drawer system provides a system of interchangeable components that are easy to assemble. The system requires few fasteners because most of the parts are slidably interconnected. Many parts perform dual functions. A removable lock tray and a tracking mechanism to provide easier steering of a rolling cart are provided. A lock bar assembly with few moving parts is easily assembled. In addition, an accessory track provides two types of attachments for accessories, a more flexible, snap-on attachment and a more permanent, bolted attachment.

68 Claims, 30 Drawing Sheets

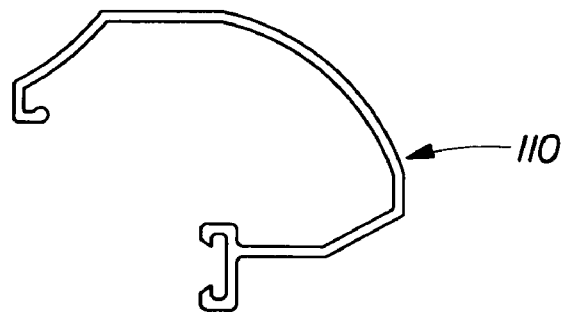
Fig. 25
Fig. 26
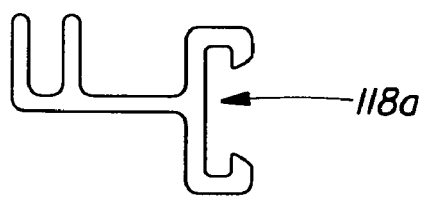
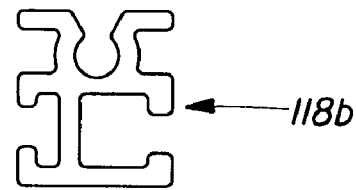
Fig. 27A
Fig. 27B
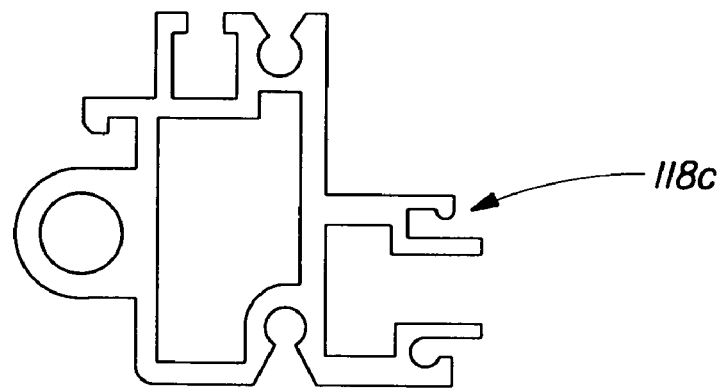
Fig. 27C

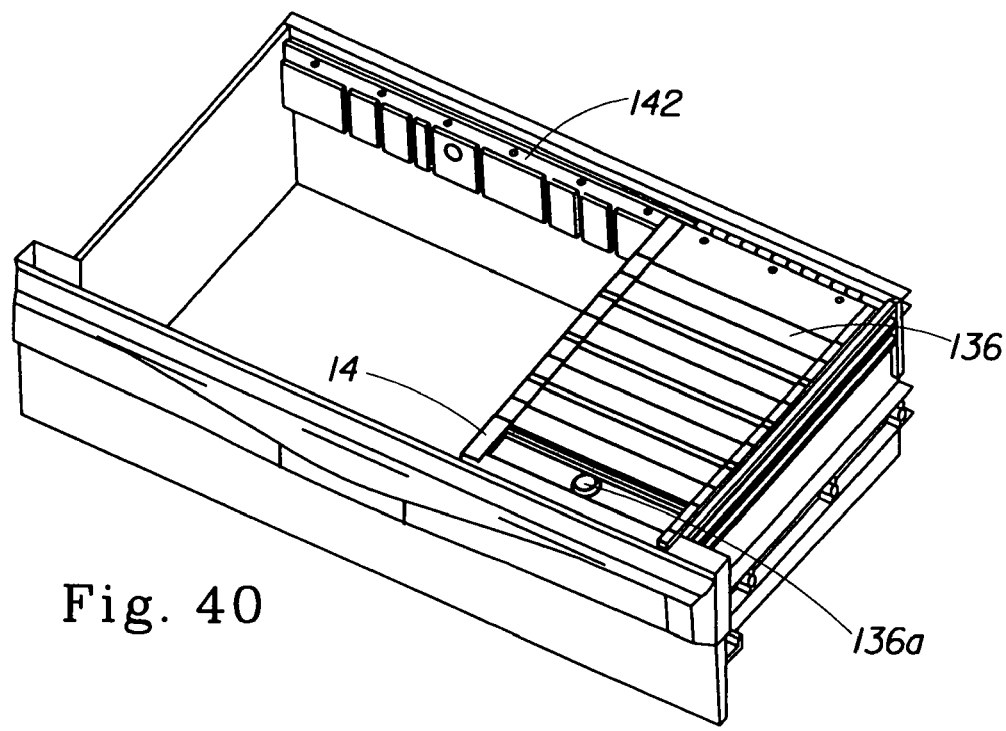
Fig. 40
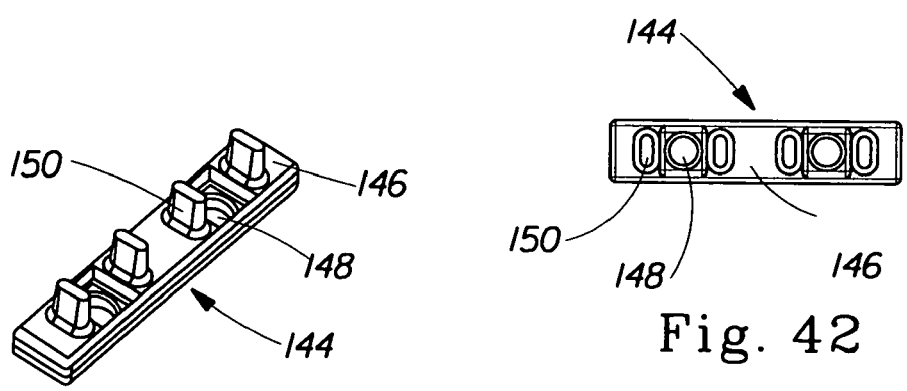
Fig. 41
Fig. 42

MODULAR DRAWER SYSTEM

This application is a continuation of application Ser. No. 08/743,619, filed Nov. 4, 1996.

BACKGROUND OF THE INVENTION

This invention pertains to a modular drawer system with components that are slidably connected. More particularly, it pertains to a modular rolling cart. Even more particularly, it pertains to a modular cart that can be used to dispense medication.

In settings where it is necessary to dispense medication to a large number of individuals in an efficient manner, such as a nursing home or a hospital, drawer systems containing a plurality of drawers and/or cassettes are often utilized. Typically, these drawer systems are supported on wheels to provide a rolling medication cart. A cassette is defined as a transportable storage device that may slide into a cart much as a drawer does. The purpose of the cassette is to provide a means of exchanging empty medication containers with ones that have been refilled. The cassette may comprise a plurality of drawers, trays or bins for organizing medications. Typically, when a cassette is inserted into the cart, the cassette drawers are locked by the same locking mechanism that locks the other drawers. In addition, the cassette may have a separate locking system so that the cassette drawers can be locked when the cassette is removed from the cart. Cassettes are often received by nursing homes with a selection of medication. When that medication has been used, the entire cassette is removed from the cart and returned to the pharmacy for replacement. A second cassette is inserted in its place.

These drawer systems typically contain drawers for the medications as well as patient records and other information necessary to the health care professional administering the medication. In addition, it is preferable that these carts act as mobile work stations, so that they provide a surface for writing and recording information, means for maintaining orderly patient charts, means for dispensing supplies and other consumables, and that they include disposal means for trash and for used sharps, such as needles.

Depending on the circumstances of use of such a cart, many different styles may be appropriate. Some applications require a cart with fewer, deeper drawers, while other applications require a cart with numerous, more shallow drawers. In addition, it may be desirable to include some drawers that provide additional locking capability because they may contain narcotics or other controlled substances. Cart size is also a factor. Depending on the space available in the hospital or nursing home hallways, a smaller or larger cart may be desired.

From a manufacturer's perspective, it is desirable to have as much uniformity among product lines as possible. It would be preferable to have common parts that can be used to build a multitude of carts which are customized to meet each individual customer's requirement by offering different sizes, shapes, and numbers of drawers. Furthermore, it may be desirable to have accessories such as sharps disposal containers, waste containers, additional work or writing surface space, lighting, and a chart storage area.

Medication carts are often used in nursing homes. The hallways in nursing homes are often carpeted, therefore, the wheels on a cart must be able to roll freely and steer easily on such carpeted floors, as well as on tiled floors. Furthermore, the cart needs to be able to be steered in a relatively small turning radius by one individual with a minimal amount of effort. The cart must also be stable, it should not easily topple over.

As previously noted, some of the medications contained within the cart may be controlled substances and so require an extra level of security. To prevent unauthorized access to any of the materials contained within the cart, it is desirable that the entire cart be able to be locked at any time when the individual responsible for the cart is away from it. Preferably, it includes a mechanism that allows any open drawer to be closed, but not reopened, while the lock is activated. More preferably, it allows for a drawer to be locked in more than one position so that if a drawer is partially closed it cannot be pulled open, but is locked in that partially closed position to minimize access to its contents. This locking mechanism can include a key lock. The lock mechanism may also be electronic so that it can be activated remotely.

It is desirable to have a simple, easily fabricated lock bar assembly to lock the drawer system with as few components as possible. Prior art systems, such as those disclosed in U.S. Pat. No. 4,822,116, Relyea et al, issued Apr. 18, 1989, provided a lock bar assembly comprising an extrusion that housed a lock tab, a spring and a pin for each drawer that was to be locked. The entire column, including the extrusion, moved up and down to lock and unlock the drawers. The locking tabs in that configuration moved vertically to engage a notch in the drawer slide and lock the drawer. It is more desirable to have a single, one piece locking tab for each drawer plane per cart side that moves within a stationary extruded column. A drawer plane is defined as a horizontal plane defined by the drawer guides in which one or more drawer slide can be located. If there are two drawer bays on a side, or if the drawer system has drawers on both sides, then there will be the possibility for two, or more, drawer slides to be in one drawer plane. Such a configuration is simpler, less expensive to make and takes less time to assemble into a lock bar assembly.

The locking mechanism needs to be durable. A drawer system of this type is often locked and unlocked many times a day. Each time a medication is removed and the operator walks away from the cart, the cart should typically be locked. To administer the next medication, the operator must unlock the cart, take out the medication and then relock the cart. Depending on the application, the lock may need to withstand hundreds of lockings and unlockings every day. It should provide years of reliable service. It is preferable that the locking mechanism be easily replaceable, if that should become necessary. For example, if a key were lost, the locking mechanism could be changed so that the previous key no longer unlocks the cart. A replaceable locking mechanism also provides manufacturing ease and the ability to replace or repair damaged locks readily. It is more preferable that the locking mechanism be a modular, replaceable article.

Assembling customized carts can be a time-consuming and expensive process. To make the carts more cost efficient, and therefore more attractive to the customers, it is preferable that a customized cart be able to be assembled with the fewest number of fasteners in the least amount of time. It is more preferable that components lock together or slidably interconnect, rather than using numerous fasteners such as screws or rivets. Furthermore, to minimize assembly time, the number of parts per drawer system, and the overall system cost, it is preferable that individual components be designed to perform more than one function.

The drawers in such a cart preferably encourage an operator to pull them open from the middle of the drawer. It encourages proper drawer opening and prevents a drawer from binding or seizing up as it might if it were pulled from the side at an angle.

Depending on the needs of a customer, the cart configuration may provide access to drawers on one side or both sides of the cart. Preferably the two sides can be locked and unlocked separately so that one side can be accessed while the other side is securely locked.

Preferably the carts can be refurbished quickly and inexpensively. They should be manufactured with easily replaceable parts that will allow for a new appearance without requiring replacement of all or most of the parts, particularly replacement of the more expensive parts. They should also be able to be reconfigured so that a customer who previously desired one drawer configuration can request another at minimal cost and with the minimal amount of down-time. Furthermore, it is desirable that the customers be able to refurbish the carts at their own facility without specialized tooling and without having to ship the cart back to the manufacturer.

SUMMARY OF THE INVENTION

The modular drawer system of the present invention is designed to meet the requirements outlined above.

In one aspect, the present invention provides a modular drawer system comprising a frame, comprising a substantially rectangular base and at least four support columns extending from the base; at least four corner column trim pieces, each being slidably connected to one of said support columns; a top, which is attached to said frame; at least one drawer bay comprising two drawer guide panels which are slidably connected to said frame by said corner column trim pieces; and, at least one drawer supported by said two drawer guide panels.

In another aspect the present invention further provides a releasable tracking mechanism for a cart that prevents at least one caster assembly from swiveling while allowing wheels of the caster assembly to continue to roll. In a further aspect the present invention provides a lock bar assembly for locking a plurality of drawers. In yet another aspect, the present invention provides a removable lock tray. Furthermore, another aspect the present invention provides a lockable lid for covering at least a portion of a drawer body. In another aspect, the present invention provides an accessory track that provides at least two different means for attaching accessories to a device.

Further aspects of the present invention will become apparent from the description provided below.

BRIEF DESCRIPTION OF THE DRAWING

FIGS. 25, 26, and 27 a,b,c are plan views of extruded profiles.

FIGS. 39 and 40 are exploded perspective and perspective views, respectively, of a drawer with a lockable lid.

FIGS. 41 and 42 are perspective and top plan views, respectively, of an accessory track.

DETAILED DESCRIPTION OF THE PREFERRED EMBODIMENTS

While the present invention is described in the form of a medication cart, it is not so limited. The present invention provides for any drawer system wherein many of the components are slidably connected. More particularly, because the components are configured to be slidably interconnected, the present invention provides for a drawer system wherein the number of fasteners are significantly reduced over the number of fasteners required by drawer systems of the prior art. The slidable connectors also allow the drawer system of the present invention to be assembled quickly. Furthermore, once the frame, described below, has been assembled, the balance of the drawer system of the present invention can be assembled without the use of alignment fixtures or specialized tools.

Figure 19:
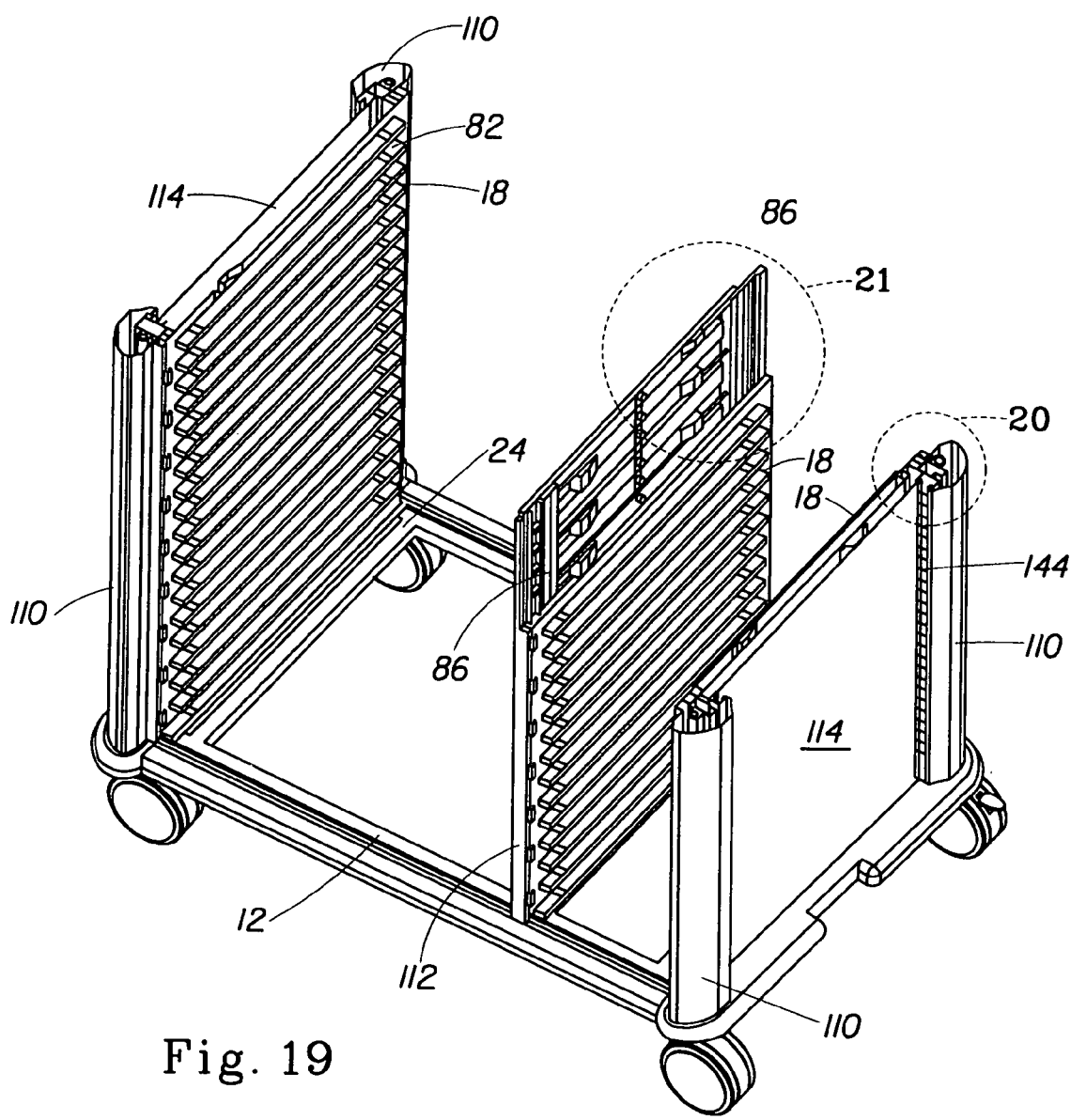
FIG. 19 is a fragmentary perspective view, partially in cross section, of a frame and drawer guide panels.

As shown in FIGS. 1–7, the drawer system indicated generally at 10 of the present invention is a modular system comprising a frame 12 (shown in FIGS. 8 and 9), a top 16 and drawer guide panels 18 (shown in FIG. 19). The drawer system 10 can be used in any application where it is desirable to have lockable drawers 20. The drawer system 10 can be used in stationary cabinetry with drawers 20 on one side of the cabinet, or on both sides of the cabinet, in a back-to-back arrangement. The drawer system 10 can also be supported by wheels or caster assemblies 22. This drawer system 10 can be outfitted with various drawers 20 and other accessories to provide a customized system to meet the requirements of the customer.

Figure 8:
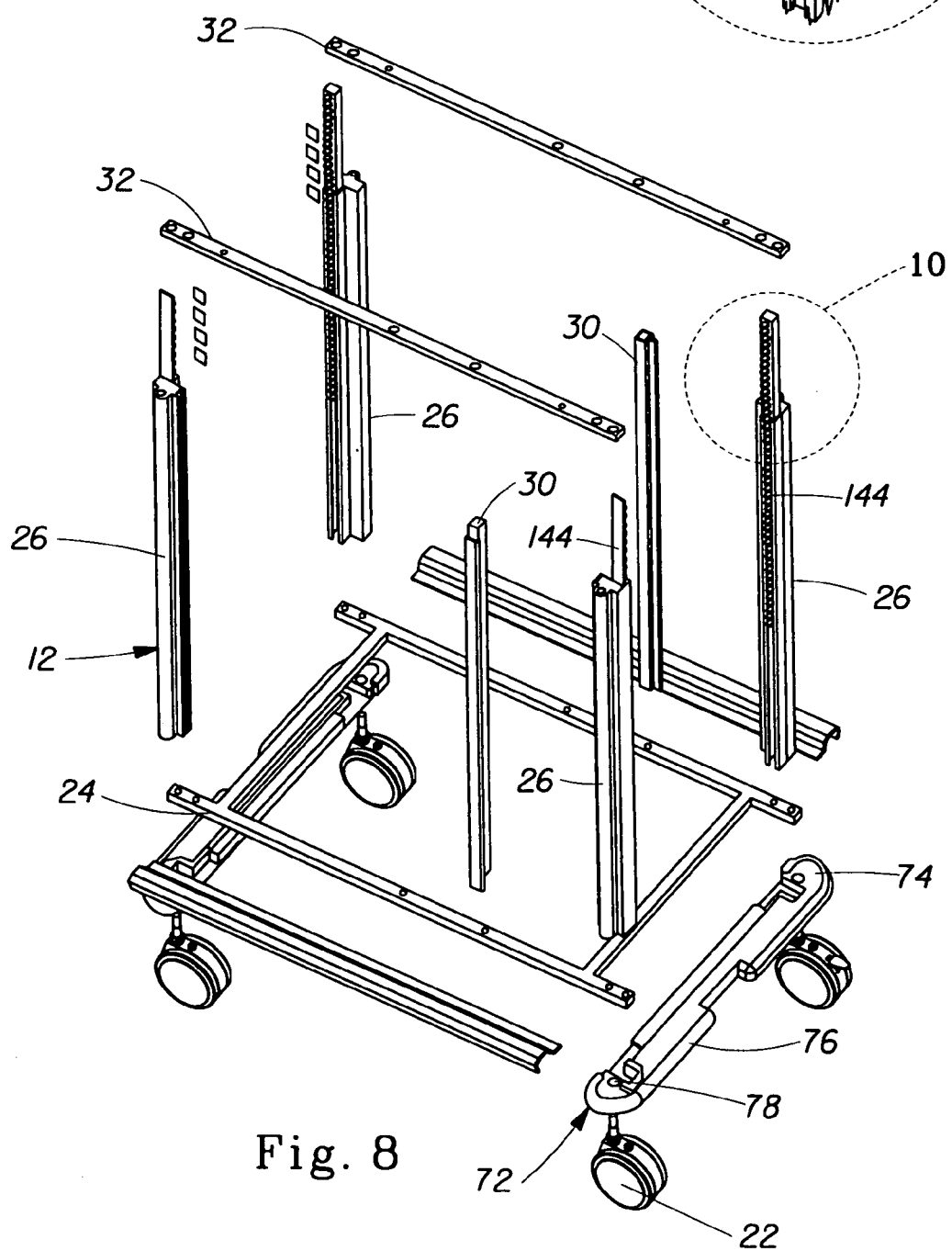
FIG. 8 is an exploded perspective view of a frame illustrated with caster assemblies and a bumper assembly.
Figure 9:
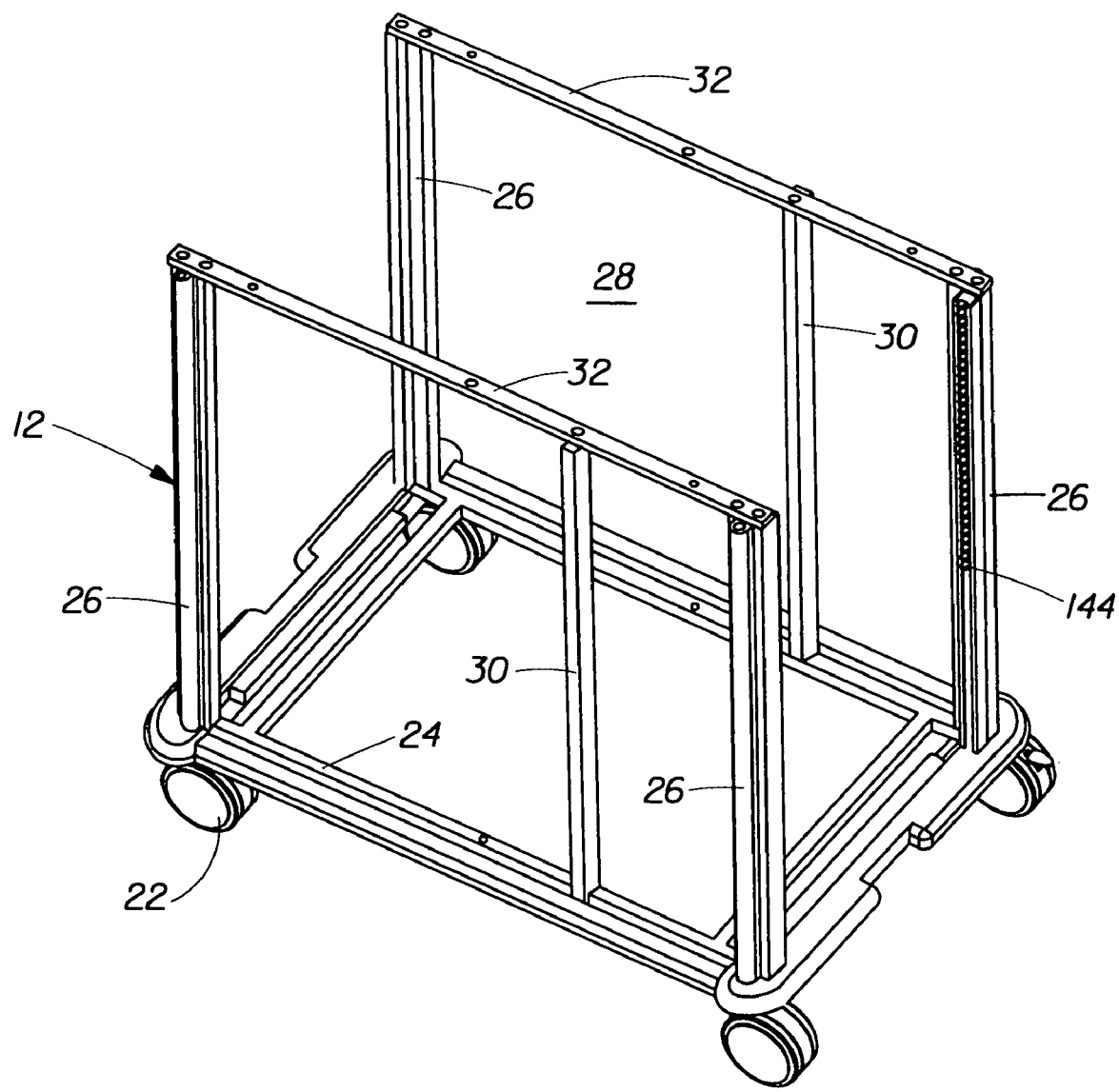
FIG. 9 is a perspective view of a frame, illustrated with caster assemblies and a bumper assembly.

Looking at FIGS. 8 and 9, the frame 12 of the present invention comprises a substantially rectangular base 24 with an upper and lower surface and a length and a width. The frame 12 further comprises support columns 26 that extend from the upper surface of the four corners of the base 24. When more than one drawer bay 28 is desired, the frame 12 may further comprise at least two additional support columns 30 that are be disposed along the length of the upper surface of the base 24. The additional support columns 30 must be situated so that one additional support column 30 is on one side of the base 24 and the other additional support column 30 is on the other side of the base 24, and the two additional support columns 30 form a plane that is perpendicular to the length of the base 24. The frame 12 may also include at least two transverse support rods 32 connecting the support columns 26, which are disposed along a length of the frame 12, to one another at the upper ends of the support columns 26. The frame 12 does not require transverse support rods 32 when sufficient stability is provided by the top 16, which is then attached to the support columns 26. A suitable top 16 will be described in further detail below.

The frame 12 can be manufactured of any material of sufficient strength and rigidity to support the drawer system 10 and provide the necessary stiffness. Preferably, the material is long-lasting, corrosion resistant and lightweight. The frame 12 can be made of any structural material known in the art including structural polymers, particularly, for example, graphite or glass pre-impregnated polymers, wood, or metal, or any combination thereof. Preferably, the base 24 and transverse support rods 32 are made of tubular steel. More preferably, they are made of roll formed 1008 steel. Preferably, the support columns 26 and 30 are made from extruded aluminum. More preferably, they are made from extruded 6063-T6 aluminum. The overall size of the frame 12 is dictated by the desired size of the drawer system 10.

The frame 12, including the base 24, the support columns 26 and the transverse support rods 32, can be manufactured as one piece, e.g. molded as a single item, or it can comprise individual parts attached to one another by welding, bolts, bonding or any other attaching means. The frame 12 components can be produced by any methods, including, but not limited to, molding, casting, extruding and machining. It is not necessary for all components to be made in the same way. More preferably, the frame 12 comprises a base 24 made of components that are welded together. The support columns 26 are preferably bolted to the base 24 and to the transverse support rods 32.

Figure 11:
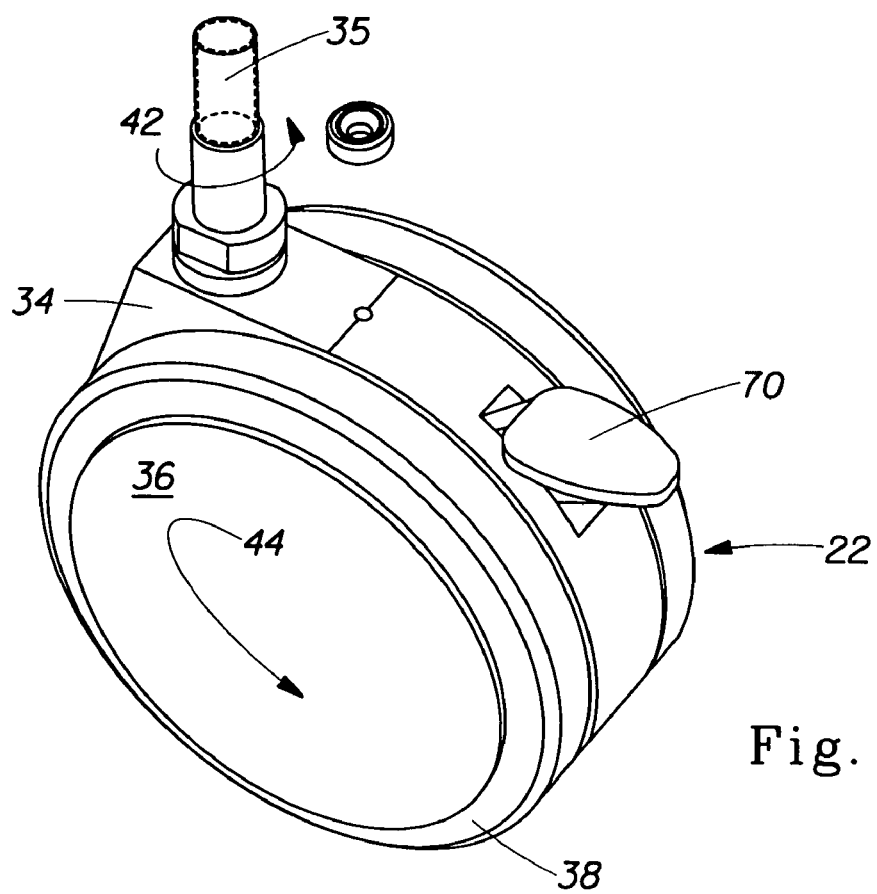
FIG. 11 is a perspective view of a caster assembly.
Figure 12:
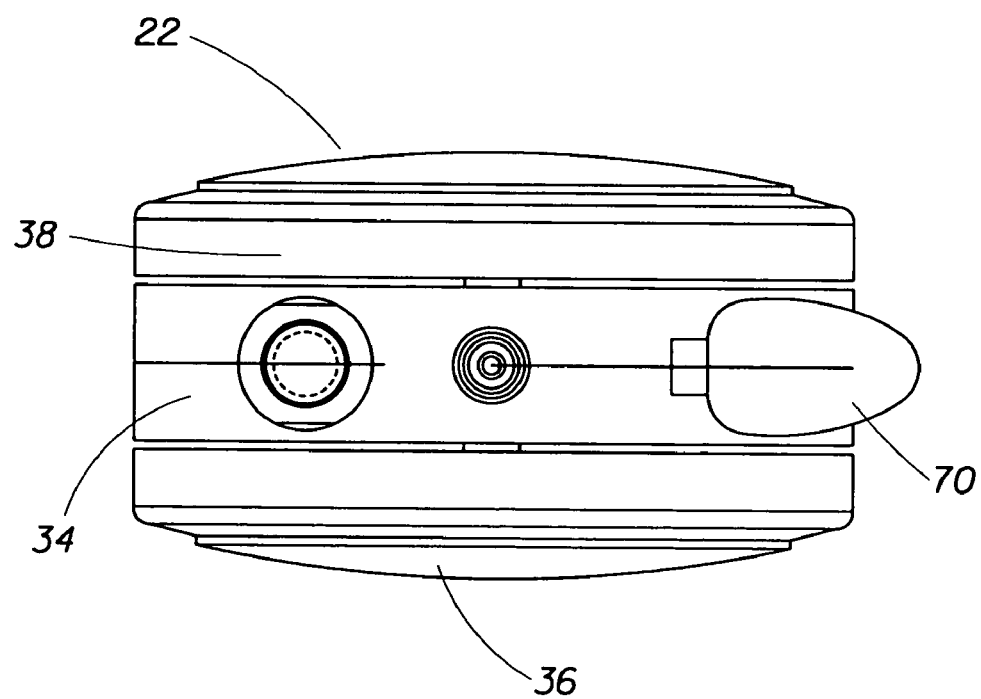
FIG. 12 is a top plan view of the caster assembly of FIG. 11.
Figure 13:
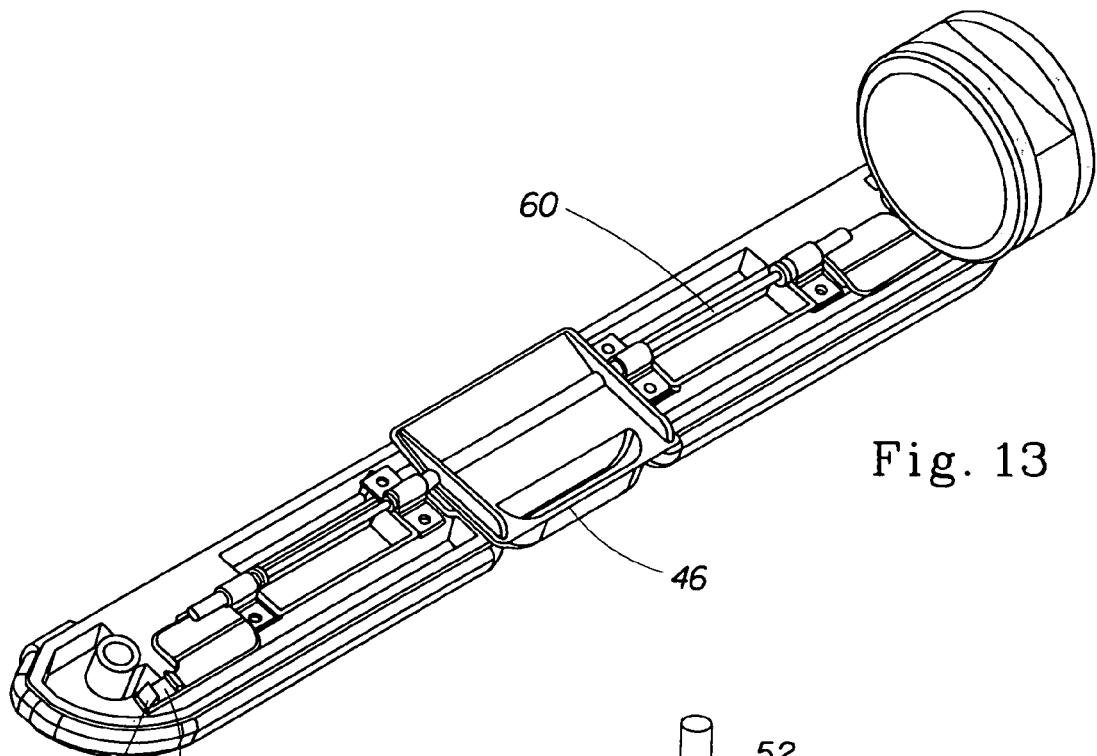
FIG. 13 is a perspective view of the underside of a tracking mechanism of the present invention.

If a rolling drawer system 10 is preferred, then at least four caster assemblies 22 are attached to the underside of the frame 12. Such caster assemblies 22 are preferably attached at the four corners of the frame 12 to maximize stability and ease of rolling. See FIGS. 11 and 12. The caster assembly 22 comprises a caster 34 and at least one wheel 36. The caster 34 provides rotation to the caster assembly 22 about a vertical axis, as indicated by directional arrow 42, and a means of attachment of the assembly to the frame 12, such as a mounting stud 35. The wheel(s) 36 provide rotation about a horizontal axis, as indicated by directional arrow 44. To minimize the number of components necessary to build a drawer system 10, it is preferable that the means of attaching the caster assembly 22 to the frame 12 also act as a means of attaching a bumper assembly 72 to the drawer system 10. Preferably, the mounting stud 35 of the caster 34 is inserted through a perforation 78 in the bumper 74, thereby holding the bumper 74 in place, as shown in FIG. 8.

The caster assemblies 22 can be any type of caster assemblies 22 known in the art. The caster assemblies 22 need to roll easily, support the weight of the drawer system 10 and its contents, and provide stability. While each caster assembly 22 can comprise one caster 34 and one wheel 36, it is preferable that each caster assembly 22 comprise one caster 34 and two wheels 36. In a caster assembly 22 with two wheels 36, the wheels 36 are preferably disposed on either side of the caster 34. Preferably, each wheel 36 is approximately 5" in diameter. The caster 34 and wheel(s) 36 of each caster assembly 22 can be made of metal, thermoplastic, thermoset plastic, elastomeric materials, or combinations thereof. Preferably, the caster 34 and wheel(s) 36 are injection molded thermoplastic. More preferably, the wheel 36 includes an elastomeric band 38 that covers its perimeter.

Preferably at least one caster assembly 22 has a releasable tracking mechanism 40 that can be activated for all affected caster assemblies 22 from one point on the drawer system 10. If the drawer system 10 includes a fifth caster assembly 22 that is located approximately in the center of the base 24, it is preferable that the releasable tracking mechanism 40 act upon that fifth caster assembly 22. More preferably, two caster assemblies 22, located in a plane which is perpendicular to the direction of travel, have a releasable tracking mechanism 40. When it is engaged, the tracking mechanism prevents the caster assemblies 22 from rotating around a vertical axis indicated by directional arrow 42 and aligns the wheels 36 parallel to the direction of travel of the cart. Because the caster 34 can no longer rotate about a vertical axis as indicated by directional arrow 42 but the wheels 36 can still rotate about a horizontal axis indicated by directional arrow 44, this provides for easier steering of the drawer system 10.

The tracking mechanism 40, shown in FIGS. 13–16, can be activated by any mechanical or electromechanical means, including but not limited to a foot pedal 46, a triggering device on the handle or elsewhere on the drawer system 10, or by remote electronic means. Such a releasable tracking mechanism 40 preferably comprises a foot pedal 46 which activates it. The tracking mechanism 40 further comprises a locking plate 48 which causes a locking pin 50 to become engaged by a detent 52. There is no limitation as to the location of the locking pin 50 and the detent 52. The locking pin 50 can be located on the locking plate 48, in which case the detent 52 is then located on the caster 34. The locking pin 50 can also be located on the caster 34 and the detent 52 is located on the locking plate 48. While there is no limitation on the configuration of the locking pin 50 and the detent 52, it is preferable that the detent 52 include a means for allowing the caster assembly 22 to lock into place when the caster 34 is out of alignment at the time the tracking mechanism is engaged. Such means can include an angled guide ramp 54 which allows the caster assembly 22 to swivel into position until the locking pin 50 is captured by the detent 52 but does not allow the locking pin 50 to disengage from the detent 52 until the tracking mechanism is released.

Figure 14:
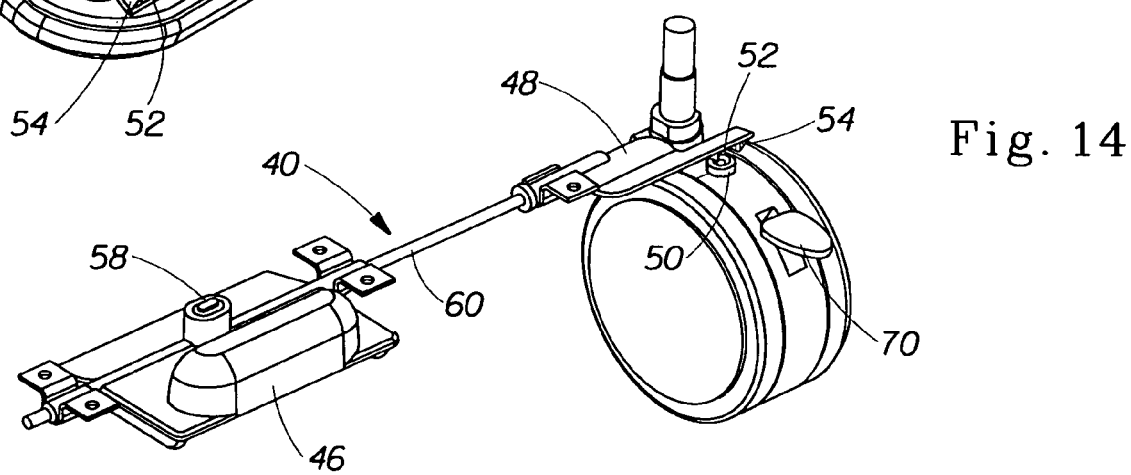
FIG. 14 is a fragmentary perspective view of the tracking mechanism of FIG. 13, wherein the locking pin and detent are not engaged.
Figure 15:
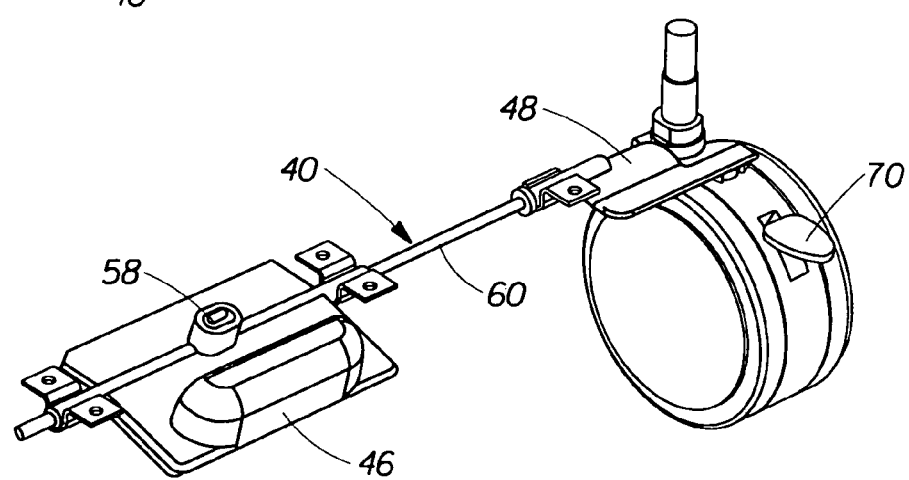
FIG. 15 is a fragmentary perspective view of the tracking mechanism of FIG. 13, wherein the locking pin and the detent are engaged.
Figure 16:
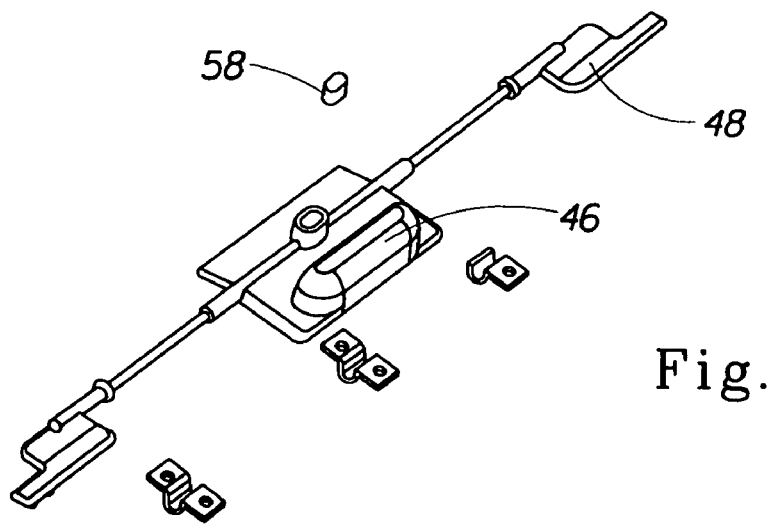
FIG. 16 is a exploded view of the foot pedal, connecting means and locking plates of the tracking mechanism.
Figure 16A:
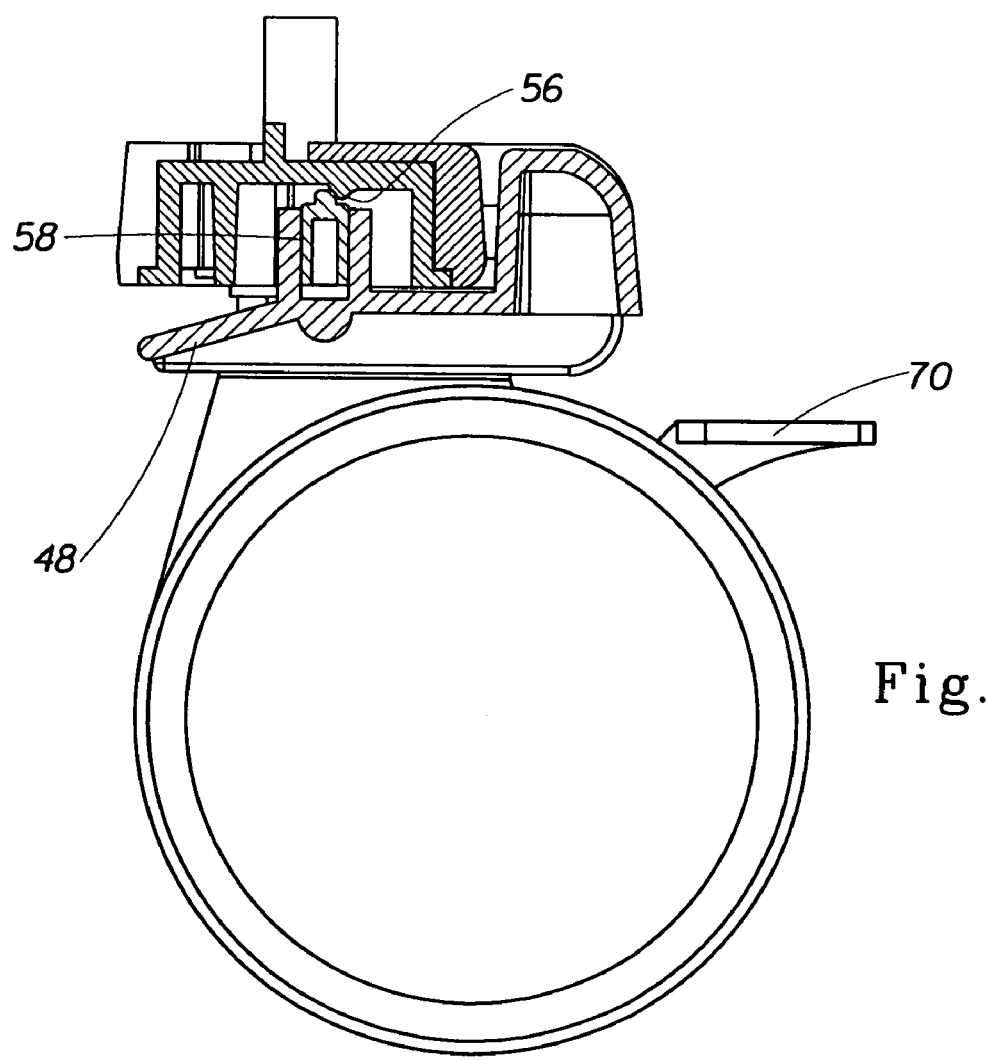
FIG. 16a is a fragmentary elevational view, partially in cross section, of the foot pedal, and plunger of the tracking mechanism, and a protuberance on the underside of a bumper assembly.

The tracking mechanism can be released by means of the foot pedal 46, as shown in FIG. 14. Preferably, the foot pedal 46 is located approximately in the center of the width of the frame 12. Preferably, the foot pedal 46 includes a spring-loaded plunger 58 that moves from one side to the other side of a protuberance 56 located on the underside of either the frame 12 or the bumper assembly 72 when the foot pedal 46 is depressed. Preferably, the protuberance 56 is located on the underside of the bumper assembly 72. When the plunger 58 is on one side of the protuberance 56, the locking plates 48 are rotated such that the locking pin 50 is engaged by the detent 52. Conversely, when plunger 58 is on the other side of the protuberance 56, the locking plates 48 are rotated such that the locking pin 50 is disengaged from the detent 52. Preferably, the foot pad is attached to the locking plates 48 by connecting means 60 which rotates when the foot plate is activated, causing the rotation of the locking plate 48 into position to capture the locking pin 50, as shown in FIG. 15.

The locking plate 48, locking pin 50 and the foot pedal 46 can be made of any material that can withstand wear, the force applied by the operator, and the force of the locking pin 50 as it slides into position. Such materials can include plastics, metals or combinations thereof. Preferably the foot pedal 46, locking plate 48 and locking pin 50 are manufactured of thermoplastic. More preferably, the locking plate 48 and foot pedal 46 are made of glass reinforced Nylon. More preferably, the locking pin 50 and plunger 58 are made of materials that exhibit toughness, good lubricity and good wear characteristics. Most preferably, the locking pin 50 and plunger 58 are made of acetal. The tracking mechanism components can be made by any means known in the art, preferably they are injection molded or compression molded. The connecting means 60 between the foot pedal 46 and the locking plate 48 can be made of any material. Preferably the connecting means 60 is made from a material that can provide stiffness in a compact design. The connecting means 60 are more preferably made of metal. Even more preferably, it is made of steel. Most preferably, the steel is plated for corrosion protection.

At least one of the caster assemblies 22 may further comprise a wheel lock 70 that prevents the wheel 36 from rotating about the horizontal axis indicated by directional arrow 44 and thereby prevents the cart from rolling. Such wheel locks 70 are well known in the art. There is no limitation on the type of wheel lock 70 that can be used in the present invention.

The four support columns 26 extending from the base 24 at its four corners include means for holding an extruded covering, side and back panels and accessory tracks, all of which will be described in greater detail below.

As FIG. 8 shows, when the drawer system 10 is supported by caster assemblies 22, a bumper assembly 72 is preferably attached to the perimeter of the base 24. This bumper assembly 72 prevents damage to the drawer system 10, walls, woodwork, doorways, etc. It also provides a more pleasing appearance as the bumper assembly 72 can be colored to customer specifications. Such a bumper assembly 72 is preferably made of an impact absorbing material such as plastic, rubber, an elastomeric material, or some combination thereof. More preferably, the bumper assembly 72 comprises a rigid compression molded bumper 74 with an elastomeric bumper pad 76 attached to its perimeter. The bumper pad 76 can be attached by a snap lock feature, bonding, or by molding onto the bumper 74. More preferably, the bumper pad 76 is molded onto the bumper 74.

The bumper assembly 72 can be attached to the frame 12 by any means known in the art, including a snap lock feature, fasteners or bonding. Preferably, it is locked in place by the insertion of the caster assemblies 22 as described above.

Looking at FIGS. 17–19, and 21, at least two drawer guide panels 18 are inserted into the frame 12. These drawer guide panels 18 are preferably located at both ends of the frame 12. The drawer guide panels 18 comprise a panel 80 having numerous guide rails 82. A drawer slide 124 of a drawer 20 is supported by the guide rails 82 of the drawer guide panels 18. The drawer guide panels 18 preferably extend substantially across the width of the base 24 and extend substantially the height of the frame 12.

Figure 17:
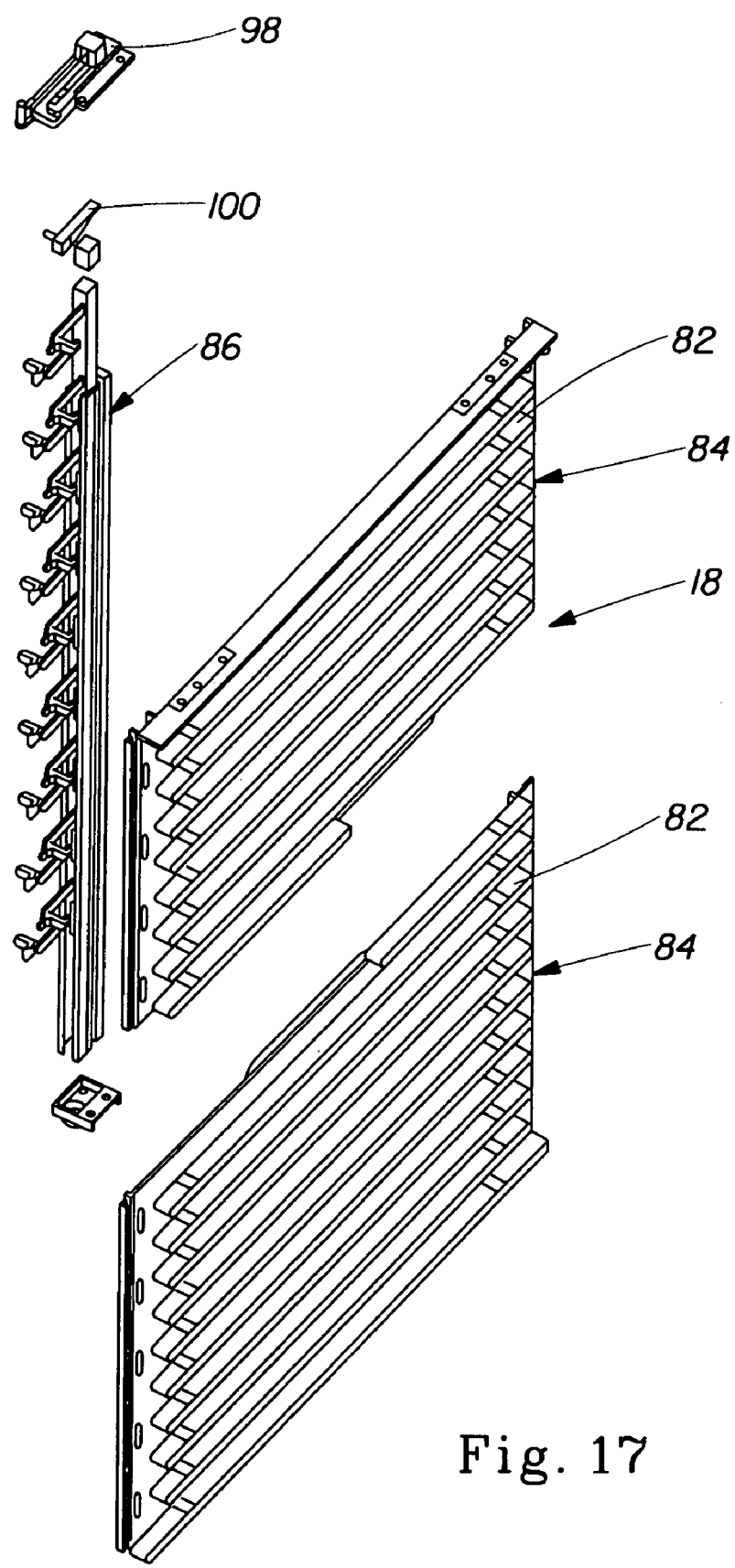
FIG. 17 is an exploded view of a drawer guide panel and lock bar assembly of the present invention.

To minimize the number of different pieces that need to be manufactured, while maximizing the flexibility to manufacture a cart to a customer specification, the drawer guide panels 18 are preferably made of at least two components 84, as FIG. 17 shows. In the most preferable configuration, a single drawer guide panel 18 is made of two individual components 84. Preferably, each component 84 is either a five guide rail configuration or a four guide rail configuration. This allows the manufacturer to produce a drawer guide panel 18 that has 8, 9 or 10 pairs of guide rails 82 depending on whether a drawer guide panel 18 is made of two guide rail components 84 each with four pairs of guide rails 82, two guide rail components 84 each with five pairs of guide rails 82, or component 84 with four pairs of guide rails 82 and one guide rail component 84 with five pairs of guide rails 82.

The drawer guide panels 18 can be made of any material that will withstand the wear caused by the constant sliding back and forth of the drawers 20, and will support the weight of the drawers 20. Such materials can include thermoplastics, thermoset plastics and metals. Preferably the drawer guide components 84 are injection molded, compression molded or thermoformed thermoplastic. If a drawer guide panel 18 comprises two or more components 84, the components 84 can be held together by screws, bolts, rivets, bonding or a snap lock feature. Preferably, the drawer guide panel 18 comprises two components 84 that are fastened together with screws.

Figure 18:
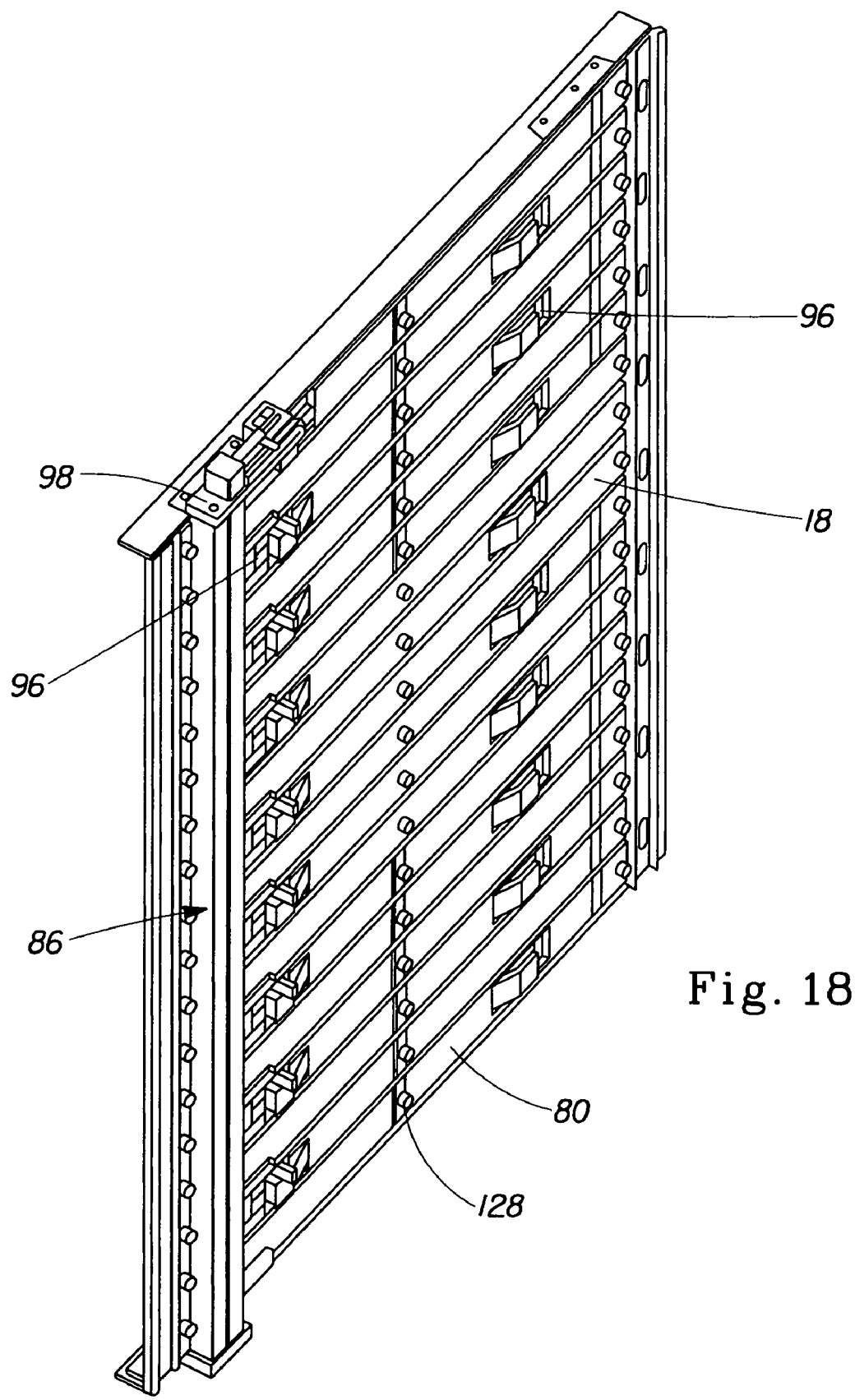
FIG. 18 is an perspective view of the drawer guide panel and the lock bar assembly of FIG. 17.

The drawer system 10, shown in FIG. 18, may further comprise at least one lock bar assembly 86. This lock bar assembly 86 prevents the unauthorized opening of the drawers 20 in the drawer system 10 when it is activated. The lock bar assembly 86 must be located such that it can lock and unlock the plurality of drawers 20 positioned on one side of the drawer system 10. Should there be more than one drawer bay 28 on a side, a single lock bar assembly 86 can lock the drawers 20 in both drawer bays 28. Should the drawer system 10 be a two sided system with drawers 20 on both sides of the system, then two lock bar assemblies 86 would be required, one for each side of the drawer system 10.

Preferably, the lock bar assembly 86 is incorporated into the drawer system 10 in such a way as to minimize any tolerance stackup problems. More preferably, the drawer lock bar assembly 86 is attached to the drawer guide panel 18. This ensures that the lock bar assembly 86 will line up properly with the drawer slides 124, thereby minimizing any tolerance stackup problems.

Figure 22:
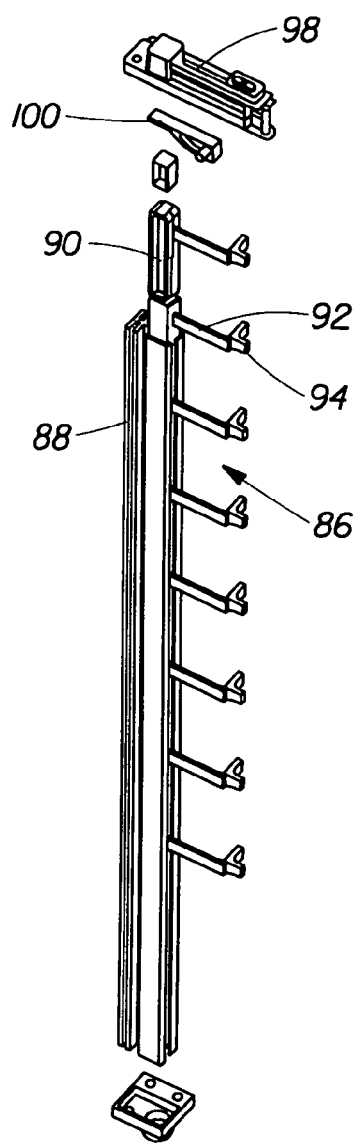
FIG. 22 is an exploded perspective view of a lock bar assembly of the present invention, illustrated with locking tabs on one side only.
Figure 23:
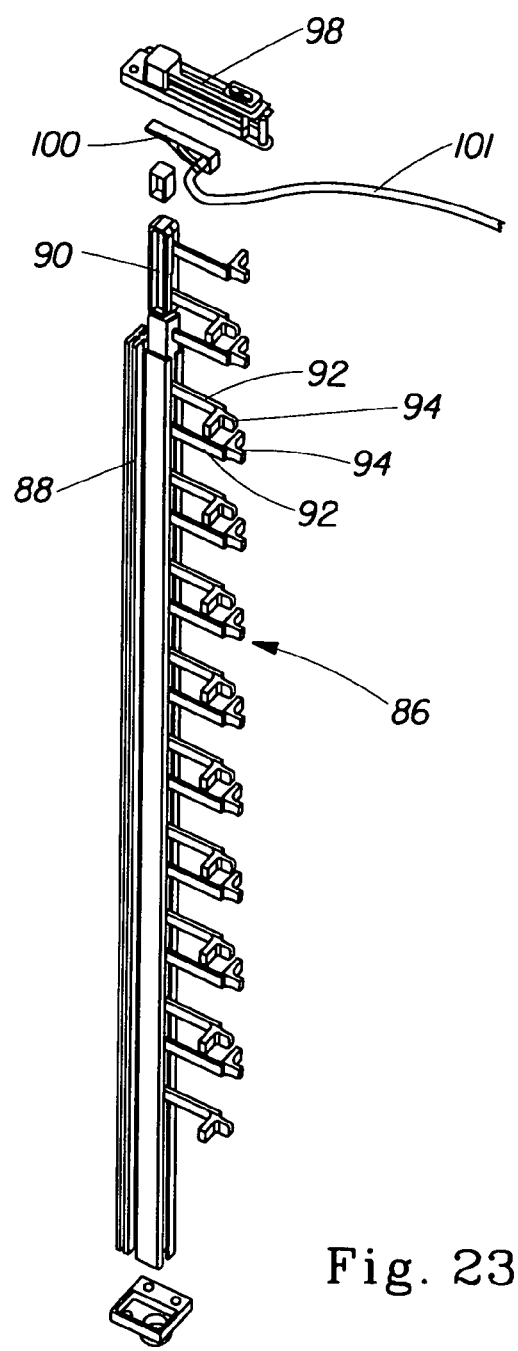
FIG. 23 is an exploded perspective view of a lock bar assembly of the present invention, illustrated with locking tabs on two sides.

As shown in FIGS. 22 and 23, the lock bar assembly 86 can include any means for locking the drawers 20 known in the art, including the locking means disclosed in U.S. Pat. No. 4,822,116, Relyea et al., issued Apr. 18, 1989, and incorporated herein by reference. Preferably, the lock bar assembly 86 comprises a lock column 88 and at least one lock bar 90. The lock column 88 provides a means for attaching and locating the lock bar(s) 90 within the drawer system 10. The lock bar assembly 86 can comprise either one lock bar 90 from which extends at least one lock stem 92 or it can comprise a plurality of lock bars 90, each with at least one lock stem 92. Preferably, the lock bar assembly 86 comprises a plurality of lock bars 90.

Preferably, the lock column 88 and the lock bar(s) 90 extend substantially the height of the drawer guide panel 18. More preferably, the lock column 88 includes a channel into which one lock bar 90 or a plurality of lock bars 90 slide. Most preferably, the lock column 88 is an extrusion with a substantially U-shaped profile. As FIG. 18 shows, the lock column 88 can be attached to the drawer system 10, preferably to the drawer guide panels 18, by any means known in the art, including bonding, snap lock features, fasteners. It could also be molded or machined into the drawer guide panels 18 as an integral part of the drawer guide panel 18. Preferably, the lock column 88 is connected to the drawer guide panels 18 with screws.

Each lock bar 90, shown in FIGS. 22 and 23, has at least one means for locking a drawer 20 that allow the drawer 20 to be closed if it is open when the lock bar assembly 86 is activated. Preferably, this locking means comprises at least one locking stem 92 that can flex in only one direction in a horizontal plane, thereby allowing an open drawer 20 to be closed when the lock bar assembly 86 is engaged but not allowing a closed and locked drawer 20 to open while the lock bar assembly 86 is activated. More preferably, the lock stem 92 further comprises a locking tab 94 that blocks the motion of a corresponding capture mechanism 134 on a drawer slide 124 thereby preventing opening of the drawer 20, and the geometry of the locking tab 94 and locking stem 92 is such that the stem 92 flexes only in one direction. When the drawer system 10 comprises two drawer bays 28, the lock bar 90 must have two locking stems 92 for each drawer guide height. See FIG. 23. One locking stem 92 and tab is provided for each drawer 20 in each of the two bays 28. One lock bar 90 can comprise two locking stems 92.

Preferably, the locking tabs 94 extend through one of a plurality of holes 96 in the drawer guide panels 18, allowing the locking tab 94 to contact the drawer slide 124. See FIG. 18. The plurality of holes 96 are preferably arranged in a substantially vertical line. This vertical line of holes 96 can be located anywhere across the width of the drawer guide panels 18. Preferably, it is located either close to one of the two edges of the drawer guide panels 18 or substantially in the center of the drawer guide panel 18. More preferably, there are two lines of holes 96 in a drawer guide panel 18, one line close to each edge of the drawer guide panel 18.

Figure 24:
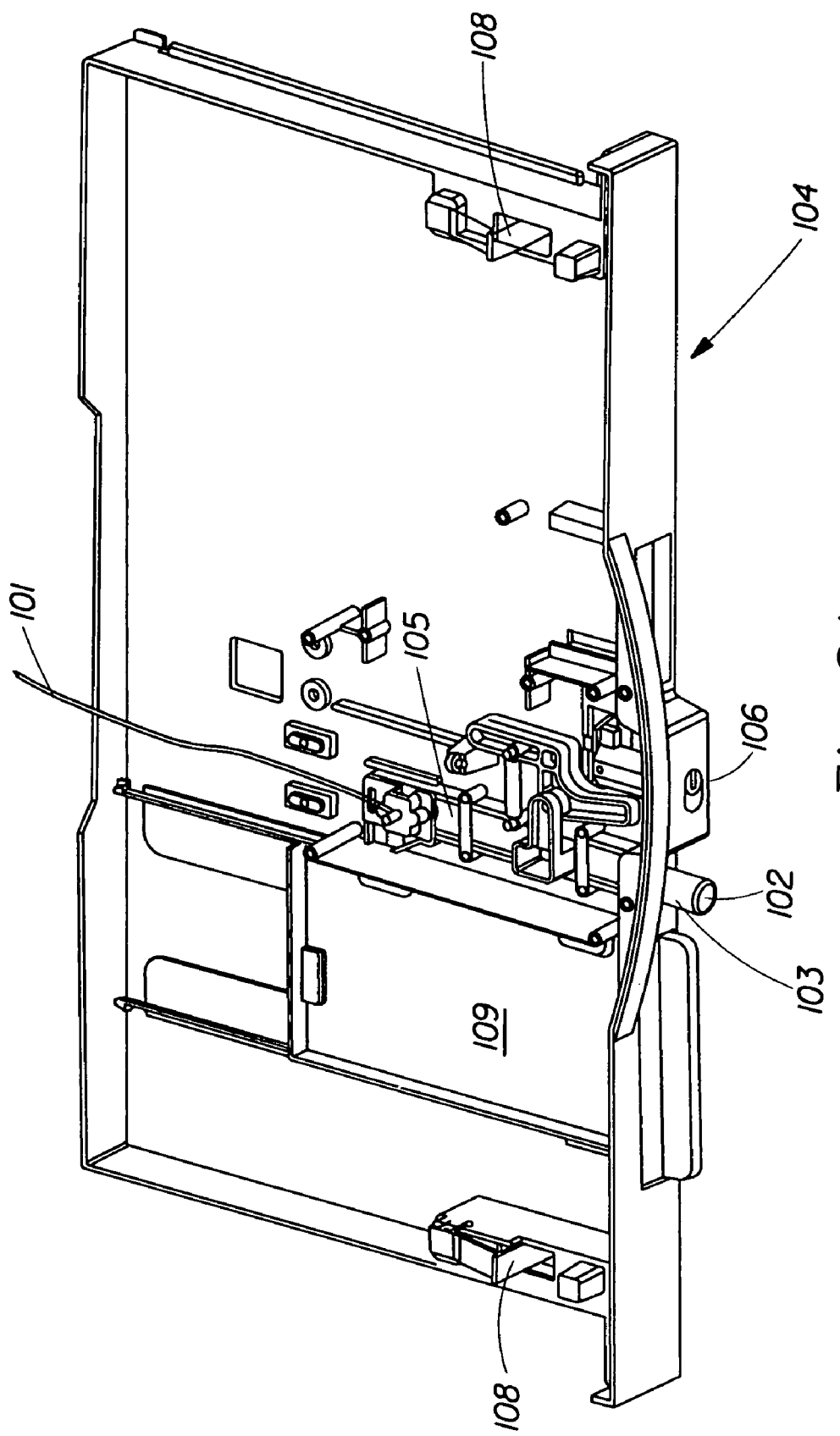
FIG. 24 is an fragmentary perspective view of the lock tray.

At the top of the lock column 88 is a locking platform 98, shown in FIG. 17. The platform includes the lock cam 100 (FIG. 7), which is preferably wedge shaped. When the locking mechanism is activated, the lock cam 100 moves laterally thereby causing the lock column 88 to move downward, allowing the lock stems 92 to slide into position and causing the lock tabs 94 to block the motion of the drawer slide 124. The lock cam 100 is connected to the lock 102 (FIG. 24). Preferably, the connecting means are flexible so that the lock tray 104, which will be described further below, can be removed from the drawer system 10 while still connected to the drawer system 10. More preferably, the connecting means comprises a cable assembly.

As FIG. 24 shows, the lock 102 is preferably contained in a lock tray 104 which can be accessed when the system is unlocked for easy replacement of any piece of the lock 102. It is preferable that the lock 102 be a plunger-type lock comprising a lock button 103 and a lock shaft 105: when the lock button 103 is pushed in, it causes a lock shaft 105 to move laterally, this lateral motion is translated through a cable assembly 101 to the lock cam 100, causing the lock cam 100 to move the lock column 88 which slides downward to move the locking stems 92, with their locking tabs 94, into the locked position. The plunger mechanism provides a more reliable and more durable option than a cam lock, however any lock 102 known in the art can be utilized in the present invention.

The lock 102 is released by use of any means, including a mechanical key or an electronic release mechanism. Electronic mechanisms are well known in the art and include remote electronic devices and vibration detecting systems that determine when a cart is not in use and automatically lock the cart after a specified time period. Key releases 106 are also well known in the art. Any key release 106 known in the art can be used in the present invention.

The lock bar 90 and the locking stems 92 must be made of materials that exhibit good wear properties and are able to withstand being flexed. Preferably, they are made from injection molded thermoplastic. Any thermoplastic known in the art can be used; however, preferably the lock bar 90, locking stem 92, and locking tabs 94 are made of amorphous nylon. The lock bar 90, locking stems 92 and locking tabs 94 are preferably molded as one piece. The lock bar 90 can comprise individual segments stacked together or one continuous piece. The locking platform 98 is preferably injected molded thermoplastic, more preferably it is Nylon. The lock cam 100 is preferably made of a different material than that of the locking platform 98, so that the lock cam 100 and the locking platform 98 do not fuse together over time. Preferably the lock cam 100 comprises acetal.

As illustrated in FIGS. 22 and 23, the lock cam 100 and the lock 102 are preferably connected by a flexible connecting means 101 that must be able to translate the motion of the lock 102 to the lock cam 100 and provide for the flexible connection of the lock tray 104 to the drawer system 10. Preferably, the connecting means comprises a cable assembly 101 that comprises a cable and a conduit through which the cable passes. The conduit serves to guide and constrain the motion of the cable. The cable can be made of any material that has sufficient stiffness to be able to push the lock cam 100. Preferably, it is made of twisted wire. The conduit is preferably a multilayer conduit. More preferably, it is a three layer conduit comprising an inner liner that exhibits sufficient lubricity to allow the cable to slide through it without binding, a middle layer to provide stiffness to constrain the motion of the cable and an outer jacket that provides additional stiffness. Most preferably, the liner is made from acetal, the middle layer is braided wire tube and the jacket is extruded polypropylene. The pieces of the lock 102 can be produced by machining, injection molding, compression molding, or any other methods known in the art.

Figure 1:
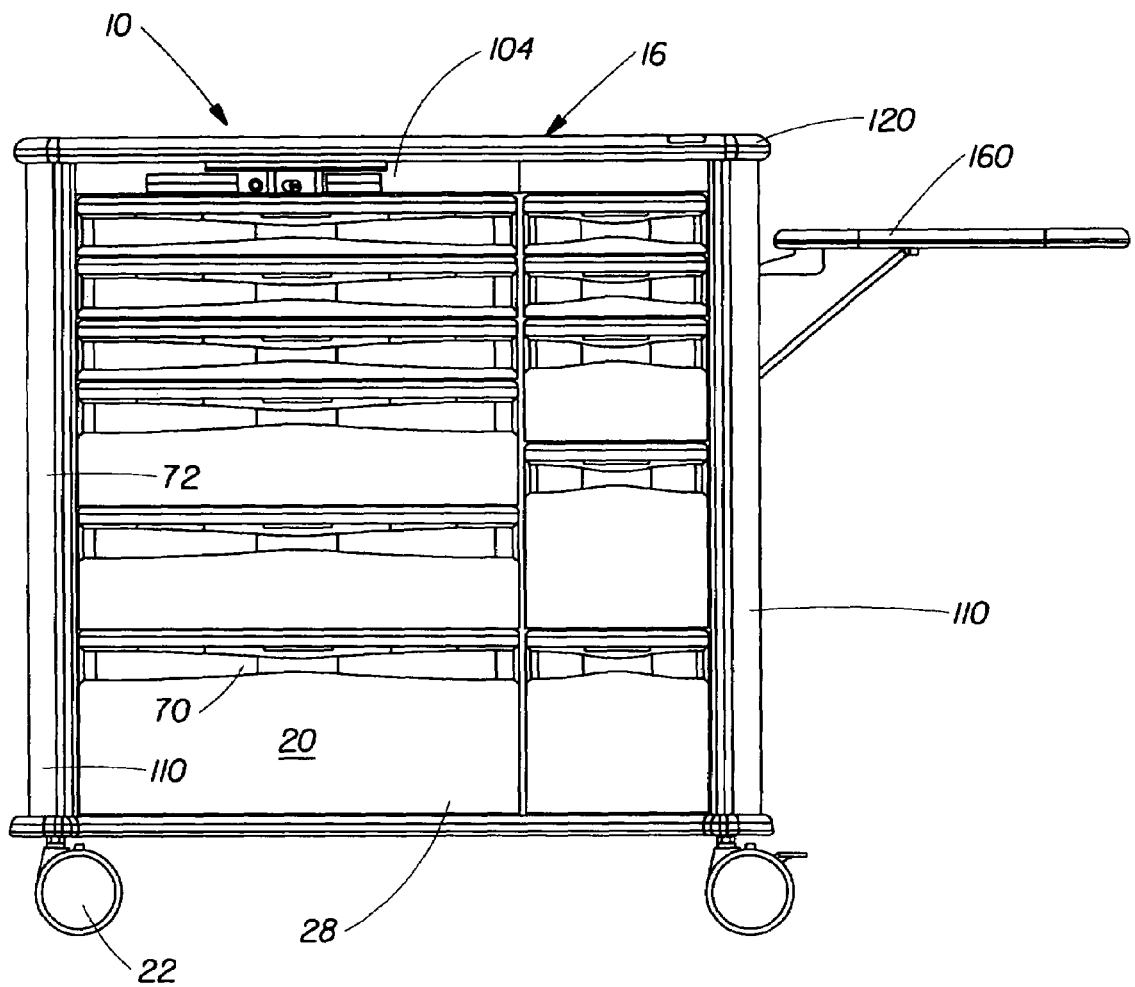
FIG. 1 is a front elevational view of a modular drawer system of the present invention illustrated with two drawer bays, caster assemblies and a shelf.
Figure 2:
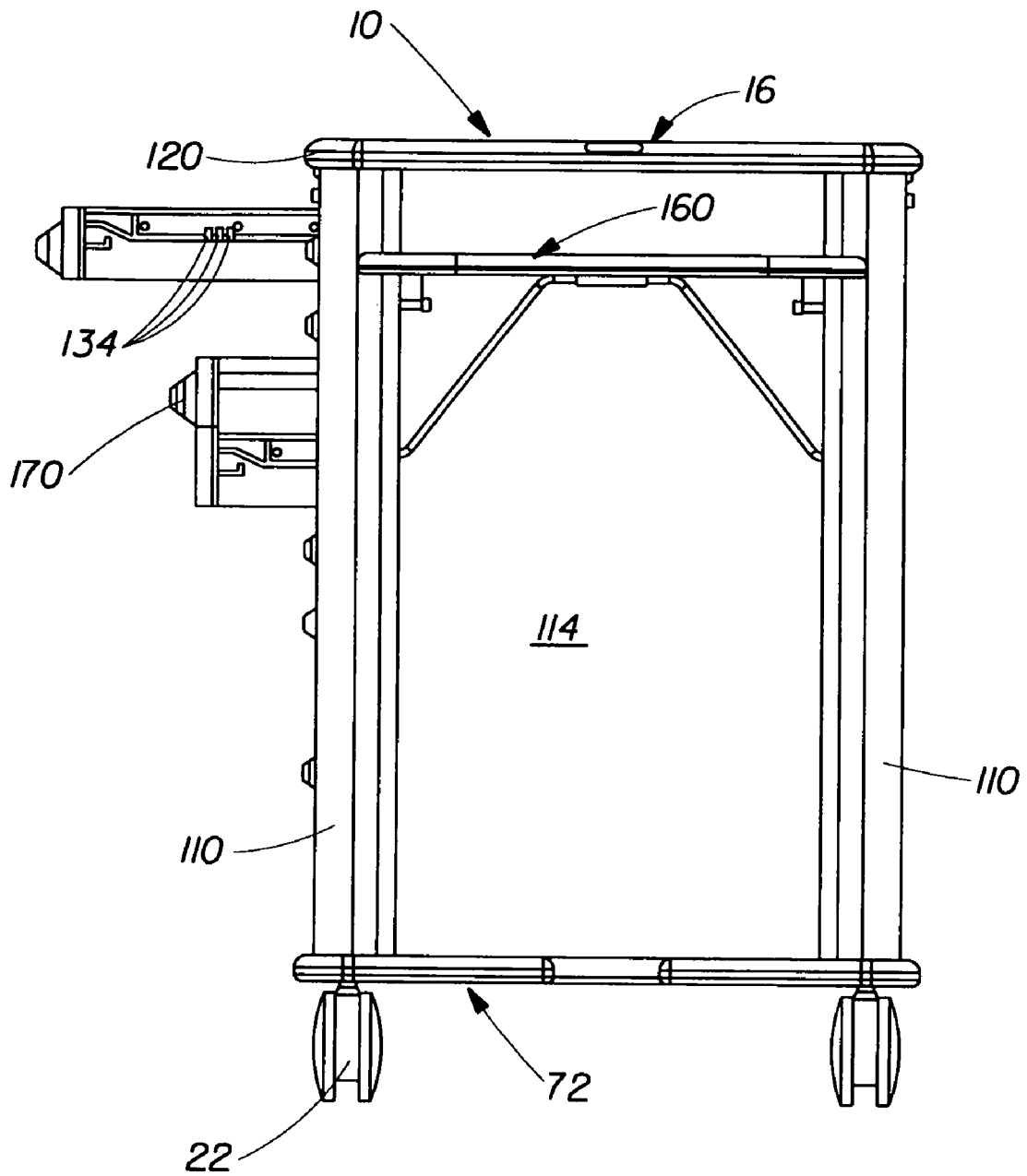
FIG. 2 is a side elevational view of the modular drawer system of FIG. 1 with two the drawers in their open position.
Figure 3:
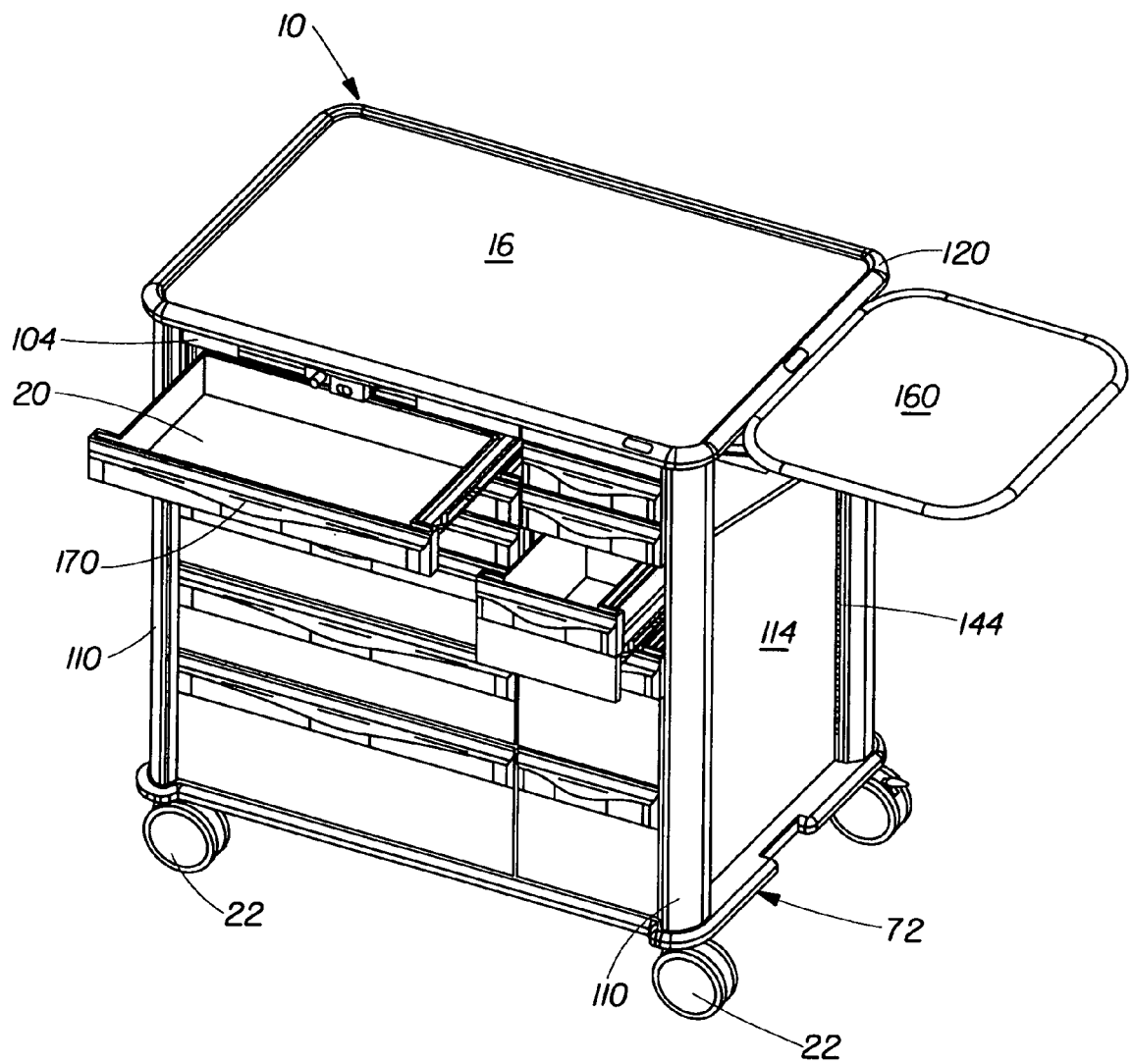
FIG. 3 is an perspective view of the modular drawer system of FIG. 1 with two drawer bays in their open position.
Figure 4:
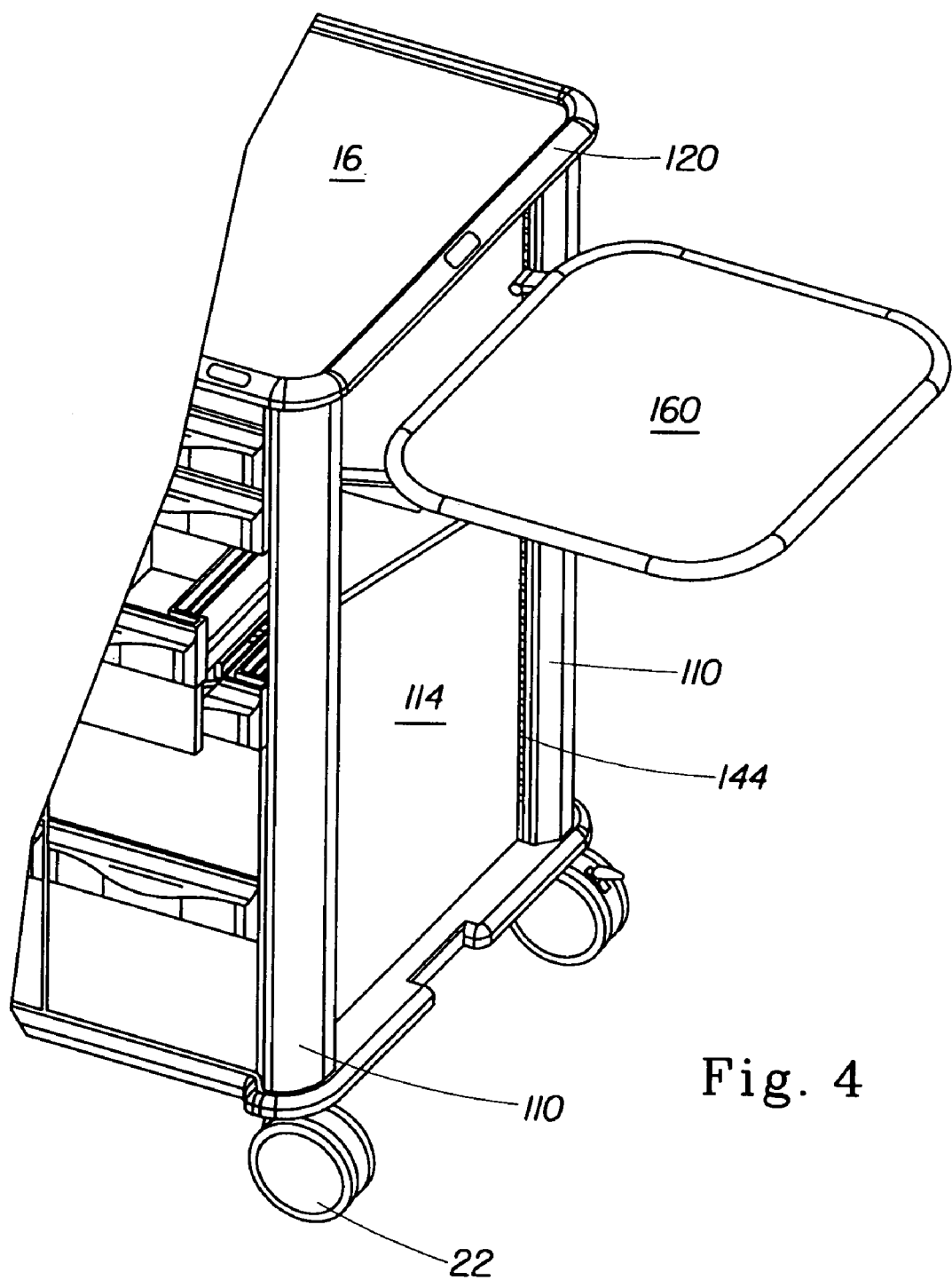
FIG. 4 is a fragmentary view of the modular drawer system of FIG. 1 showing the shelf at a different height.
Figure 5:
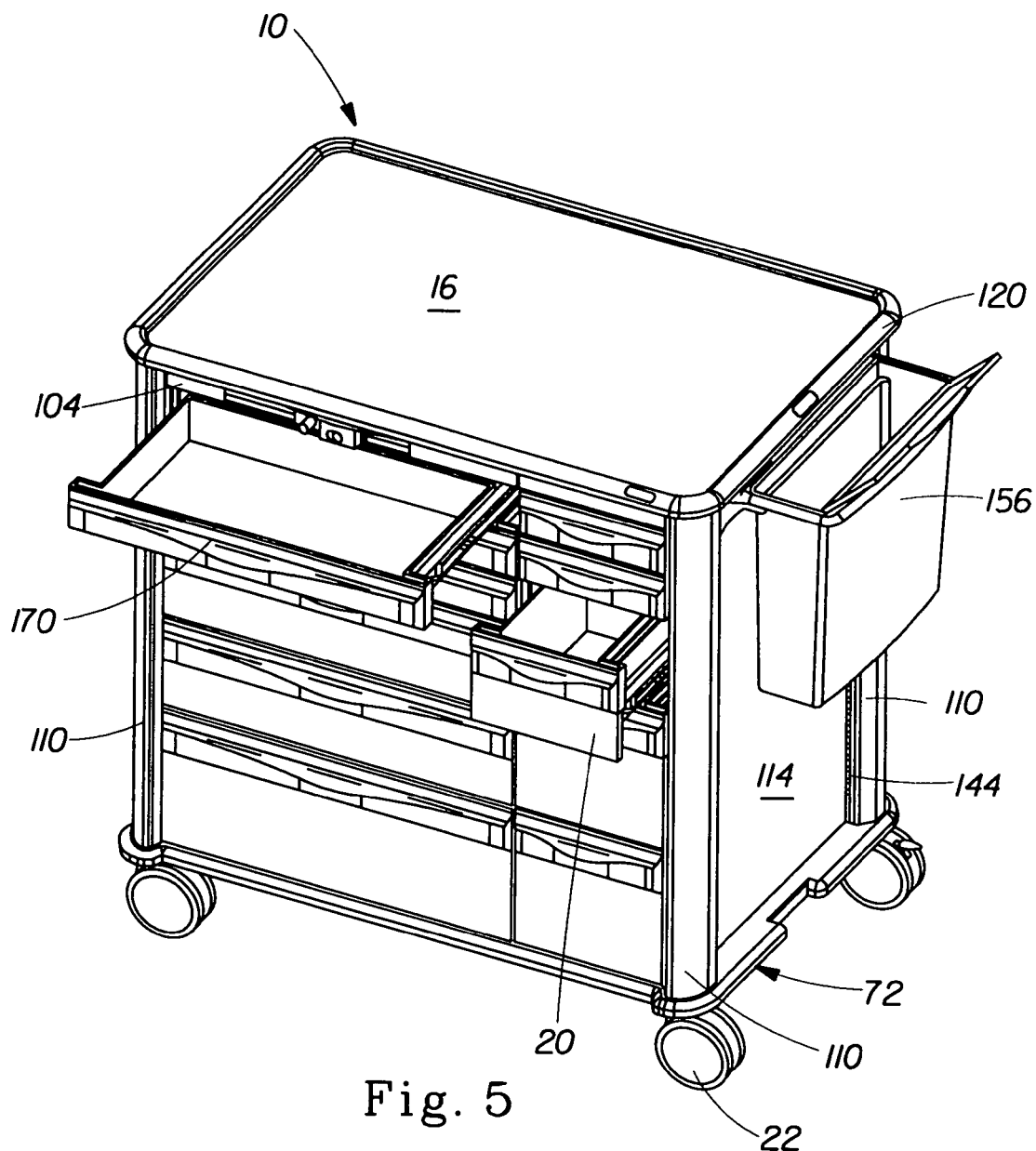
FIG. 5 is a perspective view of a modular drawer system of the present invention illustrated with a refuse container.
Figure 6:
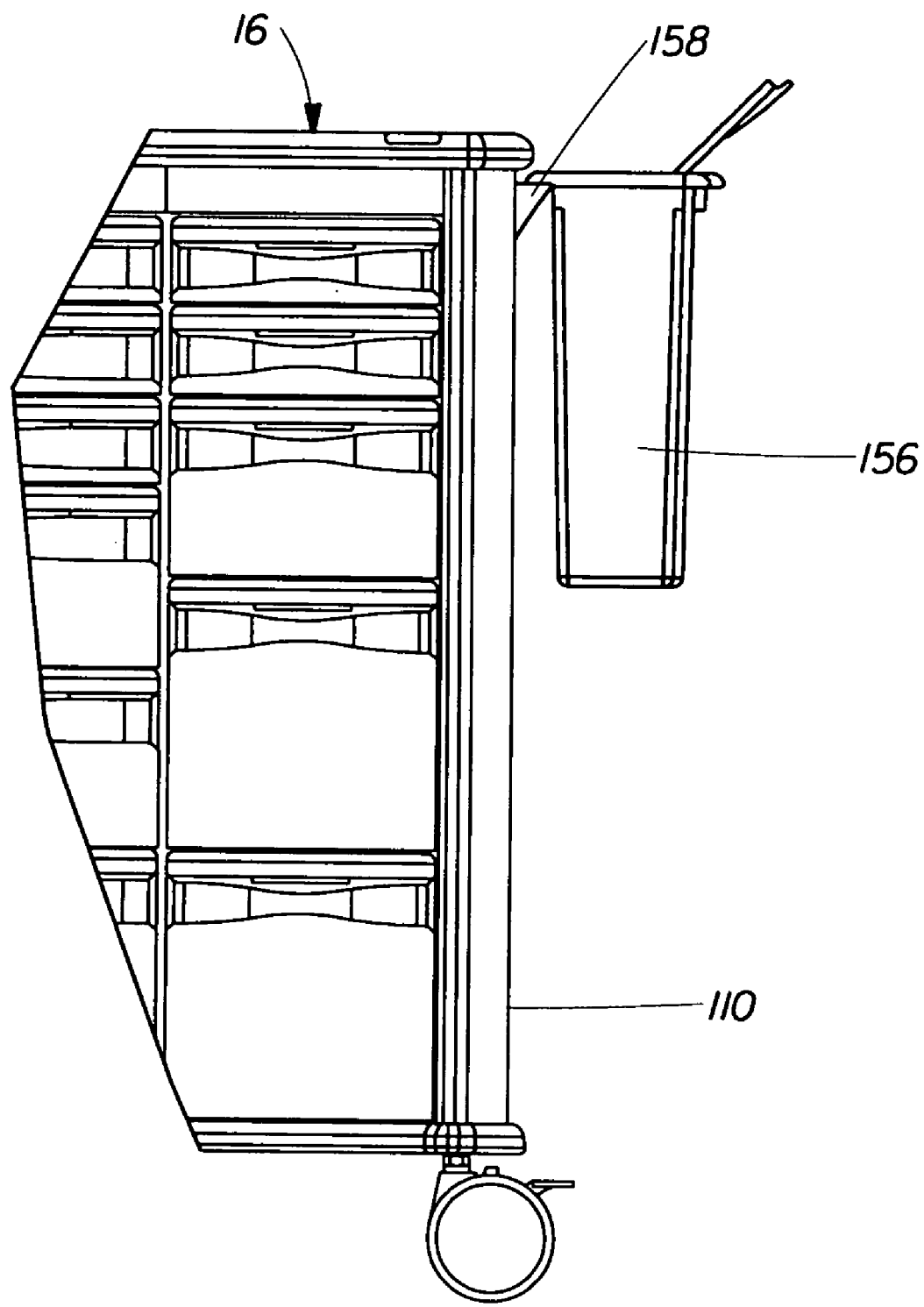
FIG. 6 is a front elevational view of the drawer system of FIG. 5.

As FIGS. 1, 3 and 5 show, if the lock 102 is contained in a lock tray 104, the lock tray 104 is inserted into the drawer system 10 like the other drawers 20, which will be further described below. It is preferable that the lock tray 104 be easily accessible to authorized personnel. The lock tray 104 should be able to be opened only when the drawers 20 in the cart are unlocked. The opening mechanism 108, depicted in FIG. 24, for the lock tray 104 is preferably contained on the under side of the lock tray 104 and is accessible by opening the drawer 20 immediately below the lock tray 104. Most preferably, it includes a release which must be pulled down, thereby clearing a retaining detent and allowing the lock tray 104 to slide out.

The drawer system 10 can include a retractable means 109 of providing information to the cart operators. This retractable means 109 can contain information about the features of the cart, the operation of the cart and any other information that the customer or the manufacturer wishes to include. Most preferably, the retractable means 109 includes a spiral bound notebook with pages that are laminated to provide durability. Such a means 109 includes a sliding tray that can be retracted into the drawer system 10 when not in use. Preferably this retractable means 109 is contained in the lock tray 104. If it is housed in the lock tray 104, it preferably includes a sliding tray which can be pulled out separately from the lock tray 104 whether the cart is locked or not.

As FIG. 19 shows, if more than one column of drawers 20 are disposed along the length of a drawer system 10, there will need to be two drawer guide panels 18 for each column of drawers 20, so that each column of drawers 20 is supported by two drawer guide panels 18 that face each other. If two columns of drawer guide panels 18 are used on one side of a drawer system 10, the lock bar assembly 86 is preferably located between the two columns of drawers 20 so that the locking stems 92 and their associated locking tabs 94 can extend into both columns of drawers 20. This allows one lock bar assembly 86 to lock and unlock both drawer bays 28 on one side of the drawer system 10.

In a configuration wherein drawers 20 are disposed on both sides of a drawer system 10, the drawer guide panels 18 containing the lock bars 90 and locking stems 92 for the two sides of the cart are preferably disposed back to back so that they occupy an area between the two columns of drawers 20. Drawer guide panels 18 hold drawers 20 on both sides of the drawer system 10. Therefore, the drawer guide panels 18 preferably have holes 96 through which locking tabs 94 can extend on both ends of the drawer guide panels 18.

Figure 20:
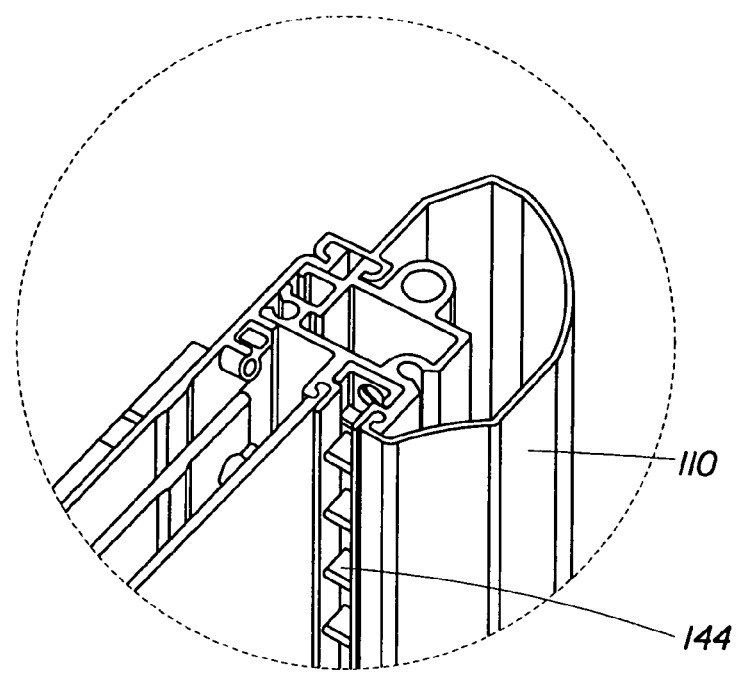
FIG. 20 is perspective view of the corner column trim piece attached to the support column.
Figure 21:
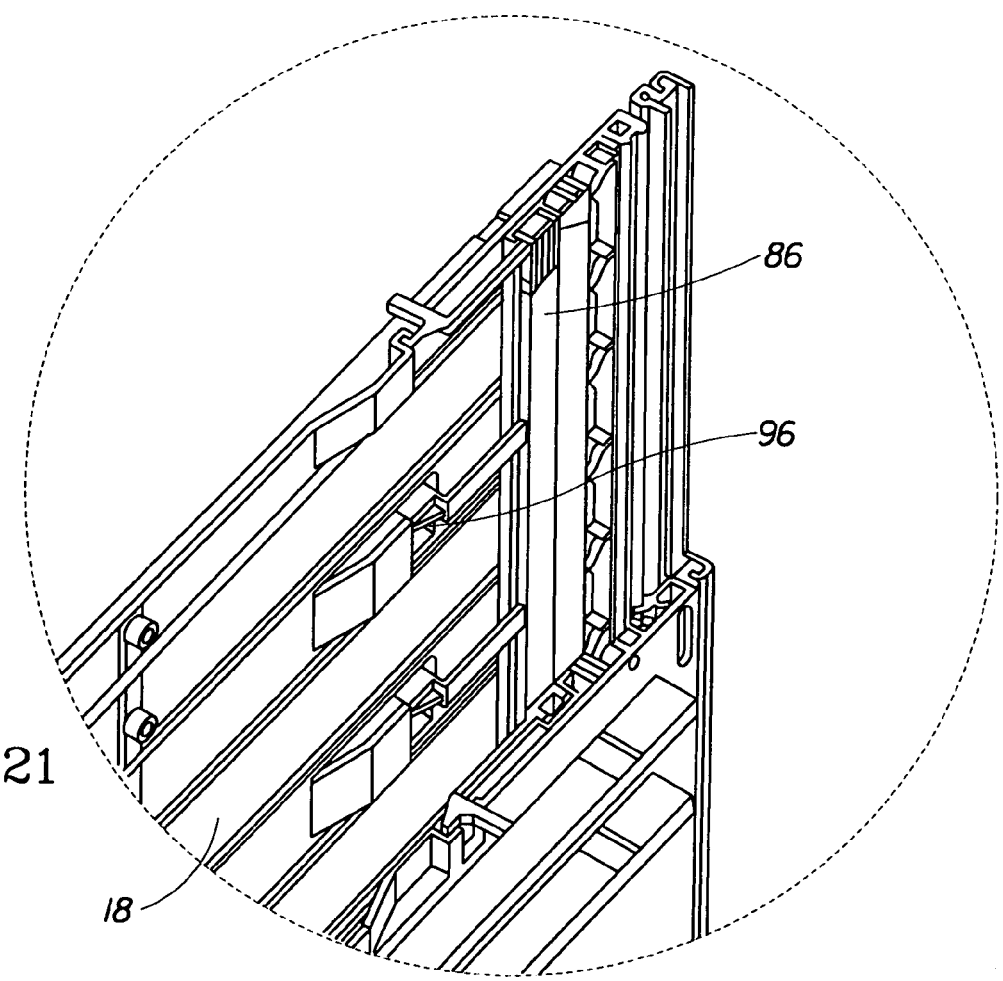
FIG. 21 is a fragmentary perspective view, partially in cross section, of the lock bar assembly and drawer guide panel.

The drawer guide panels 18 can be held between the sides of the frame 12 by any means known in the art. Preferably they are held in place at the ends of the drawer system 10 by four sliding corner column trim pieces 110, one at each corner, as shown in FIGS. 19, 20 and 25. If more than one drawer bay 28 is desired in the drawer system 10, additional drawer guide panels 18 necessary to provide the additional drawer bays 28 are held in place by sliding connectors 112. Preferably, such connectors 112 are pieces with a substantially C-shaped profile, shown in FIG. 26 that slidably connect the drawer guide panel 18 to the additional support columns 30 disposed along the length of the base 24. This substantially C-shaped profile can have guide channels along its length to allow the connecting of other pieces, such as a side panel, to the drawer system 10. This eliminates the need for any additional fasteners. Once the drawer guide panels 18 are in place in the frame 12, a corner column trim piece 110 is slid down the length of each corner support corner column trim piece 110. Lips on each corner column trim piece 110 hold a corresponding edge on the drawer guide panel 18 and on the support column 26, thereby connecting the corner column trim piece 110 and the drawer guide panel 18 to each other and to the corner support column 26. These corner column trim pieces 110 and connectors 112 can be metal or thermoplastic. Preferably, they are extruded, although they can also be machined. More preferably, they are made from extruded thermoplastic, most preferably they are extruded polyvinyl chloride.

Figure 28:
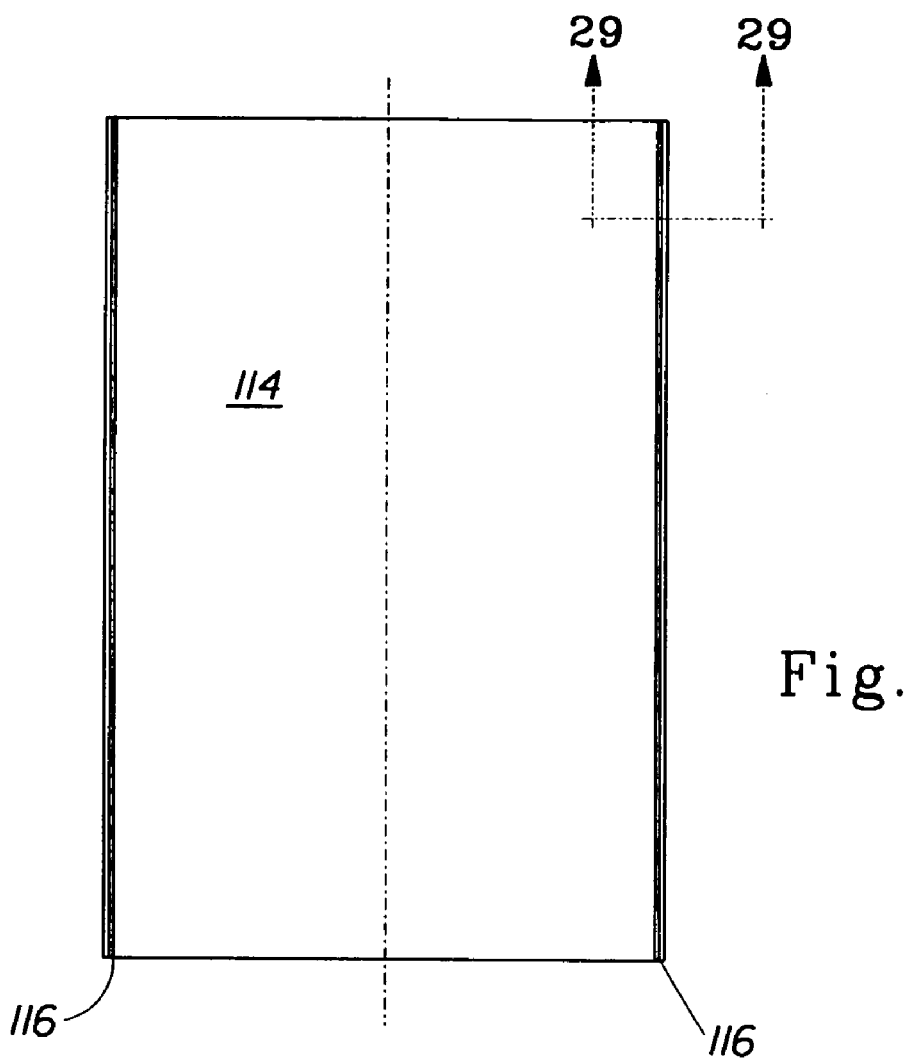
FIG. 28 is a front elevational view of an end panel.
Figure 29:
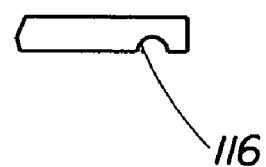
FIG. 29 is a fragmentary cross section through line 29—29 of FIG. 28.

To provide torsional stability to the drawer system 10, an end panel 114, depicted in FIG. 28, is preferably slid between the support columns 26 at the two ends of the drawer system 10. See FIG. 19. The support column 26 should have a guide channel along its length to allow insertion of the end panel 114 without the need for any fasteners. Only practical considerations limit the material used to manufacture the end panel 114. It should be lightweight, durable and relatively inexpensive. Preferably this end panel 114 comprises a sheet of thermoplastic. More preferably it comprises acrylonitrile butadiene styrene copolymer (ABS). The end panel 114 can be injection molded, thermoformed or extruded. It can also be made from extruded sheet machined to size. As shown in FIG. 29, locating means may be formed in the end panels 114 to ensure that the end panel 114 is properly positioned in the drawer system 10 and to provide a means of locking the end panel 114 in place in the drawer system 10. Such locating means can comprise a groove 116 that runs substantially the length of the end panel 114 and that slides into the receiving channel in the support column 26. Such locating means can be molded, extruded or machined into the end panel 114.

When only one side of the drawer system 10 has drawers 20, a sheet of material can be slid between guide channels to provide a back panel to a one-sided drawer system 10. This back panel can be manufactured of any material used to manufacture the end panel 114. Likewise, if only one drawer bay 28 is required on one side of a drawer system 10, any other drawer bays 28 can be covered by a side panel like that used for the end panels 114. A back panel or a side panel can be slidably connected to the drawer system 10 in the same manner as the end panels 114 are connected. Additional holding means, such as a specially profiled extrusions 118a, 118b, 118c, such as those shown in FIGS. 27a, 27b and 27c, for slidably connecting a back panel or a side panel to the frame 12 may be attached to the support columns 26 or corner trim pieces 110. Preferably, a specially profiled extrusion 118a, 118b, or 118c is attached to the corner trim piece 110. More preferably, it is attached with two sided tape. The back and side panel can be made from any of the materials used to manufacture the end panel 114.

Figure 30:
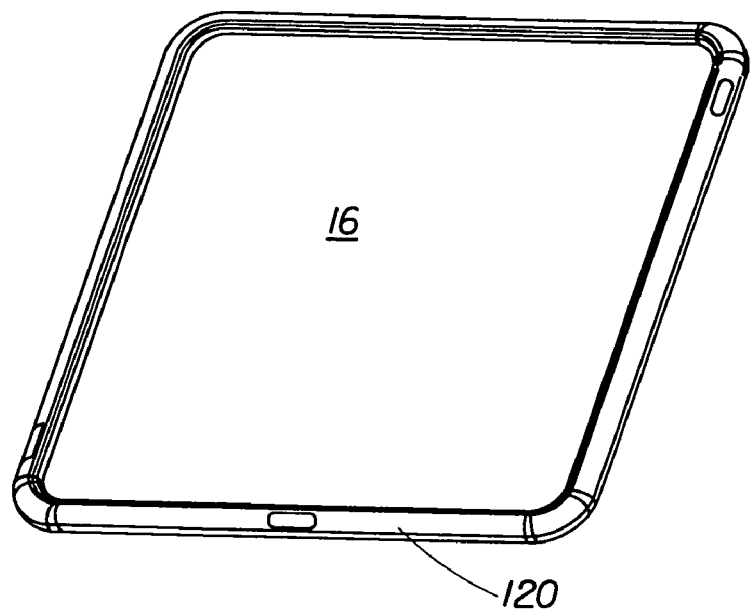
FIG. 30 is a perspective view of a top.
Figure 30A:
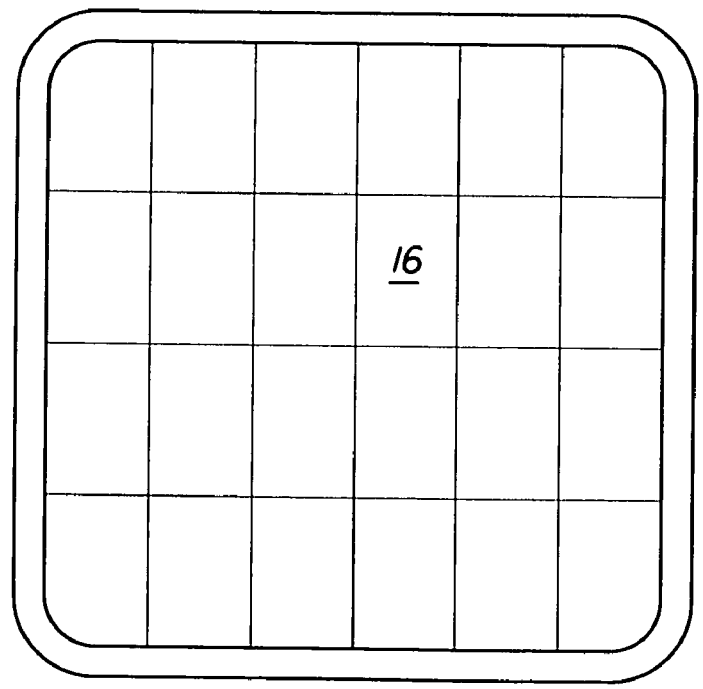
Figure 34:
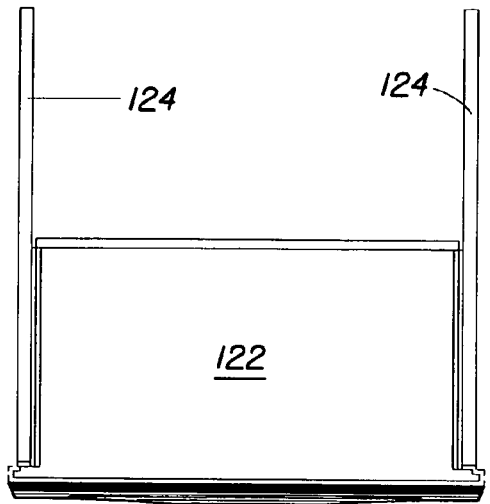
FIGS. 31–35 are exploded perspective, top plan, front elevational, bottom plan and side elevational views, respectively, of a drawer.
Figure 33:
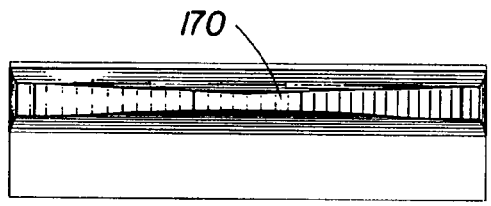

A top 16, shown in FIG. 30, is placed on top of the frame 12. See FIG. 3. The top 16 provides stability to the drawer system 10 because it connects the two sides of the frame 12. If the frame 12 includes transverse support rods 32, the top 16 serves to connect the transverse support rod 32 on one side of the frame 12 to the transverse support rod 32 of the other side. Transverse support rods 32 can also be molded into or attached to the top 16. The top 16 can also replace the transverse support rods 32. If the top 16 replaces the transverse support rods 32, there are preferably stiffening means, such as ribs, molded or machined into the top 16 to provide the necessary stiffness and stability to the drawer system 10.

The top 16 also provides a work surface. The top 16 can be attached to the transverse support rods 32, or if it contains or replaces the transverse support rods 32, to the support columns 26 by any means known in the art. Such attaching means can include fasteners, bonding, or a snap lock feature. Preferably, the top 16 is bolted to the transverse support rods 32. The top 16 can be manufactured of any material known in the art that is sufficiently rigid and will withstand exposure to chemicals and medicines. It must be easily cleaned, aesthetically pleasing and durable. Preferably, it is made of a high pressure laminate covering a wood product, similar to that used for counter tops and other case goods, such as cabinetry.

It is also preferred that the top 16 have a top bumper 120 around its outer perimeter. This material can be the same as or similar to the bumper 74 material used around the base 24 of the frame 12. It can be color coordinated so as to match the bumper 74 at the base 24 of the frame 12. It can be thermoplastic, rubber or other elastomeric material, foamed or unfoamed. Most preferably it comprises polyurethane.

As previously described, drawers 20 can be inserted along one or two sides of the drawer system 10. There is no limitation (other than practical considerations) on the configuration or size of the drawer 20 that can be utilized in the present invention. Drawers 20 typically comprise a drawer body 122 and two drawer slides 124, one on each side of the drawer body 122, as shown in FIGS. 31–35. Drawers 20 like those described in U.S. Pat. No. 4,822,116, Relyea et al, issued Apr. 18, 1989, incorporated herein by reference, can be used in the present invention. If drawers 20 are to be disposed along both sides of the drawer system 10, it is preferable that the drawers 20 be of a depth of approximately one-half of the width of the drawer system 10.

For a single sided drawer system 10, drawers 20 that extend substantially the full width of the drawer system 10 are preferred. Such a drawer 20 preferably is attached to a telescoping drawer slide 126 that will allow the drawer 20 to be completely opened without falling out of the guide rail 82. See FIGS. 36 and 37. Telescoping drawer slides 126 are well known in the art. There is no limitation on the configuration of telescoping drawer slide 126 that can be used in the present invention. The telescoping drawer slide 126 is preferably attached to the drawer guide panel 18 by fastening means, such as rivets or screws. The drawer guide panel 18 preferably includes at least one boss or molded-in insert 128 for receiving such fasteners, shown in FIG. 18.

Cassettes, as defined above, are well known in the art. One or more cassettes may be inserted into the drawer guides 126 of the drawer system 10. There is no limitation on the type of cassette that can be inserted into the drawer system 10 except that it must include a suitable drawer slide 124 that will fit into the drawer guide panel 18. Preferably, the cassette will include means of locking the cassette that are activated by the lock bar assembly 86 of the drawer system 10 when the cassette is inserted into the drawer system 10. More preferably, the cassette will further comprise a locking system that can be engaged when the cassette is not held in the drawer system 10.

Figure 36:
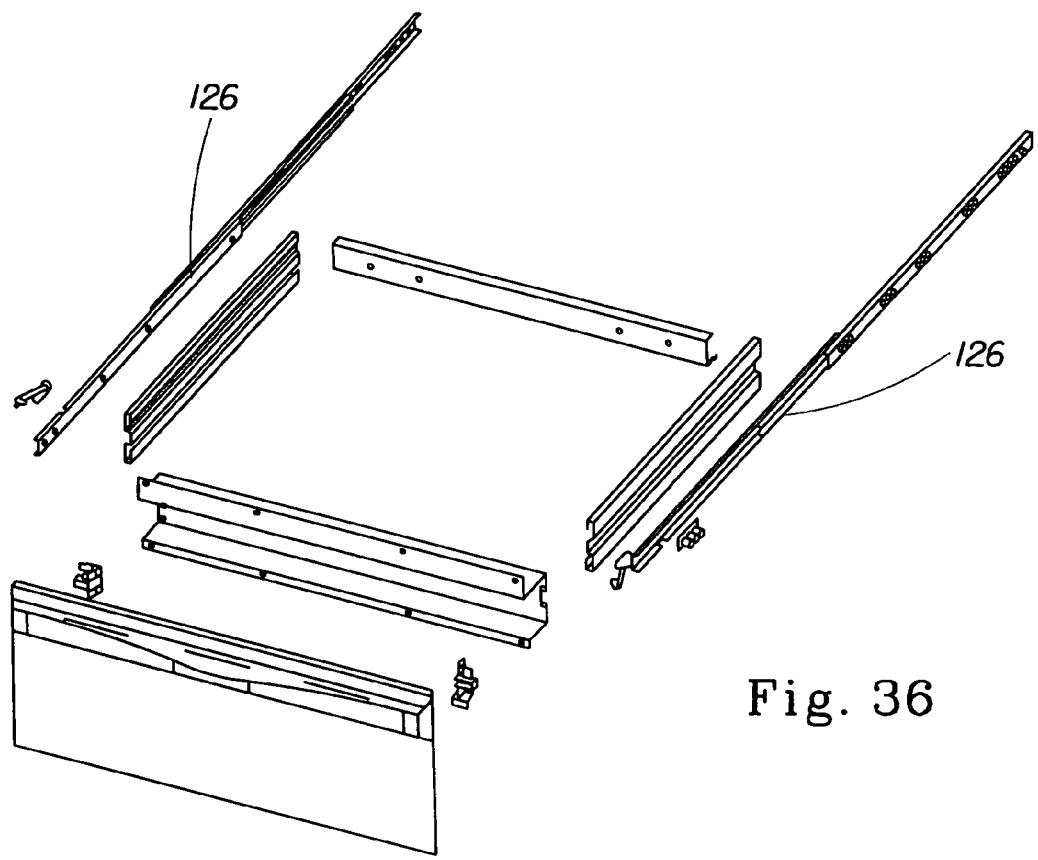
FIGS. 36 and 37 are exploded perspective and perspective views, respectively, of a punch card drawer.
Figure 37:
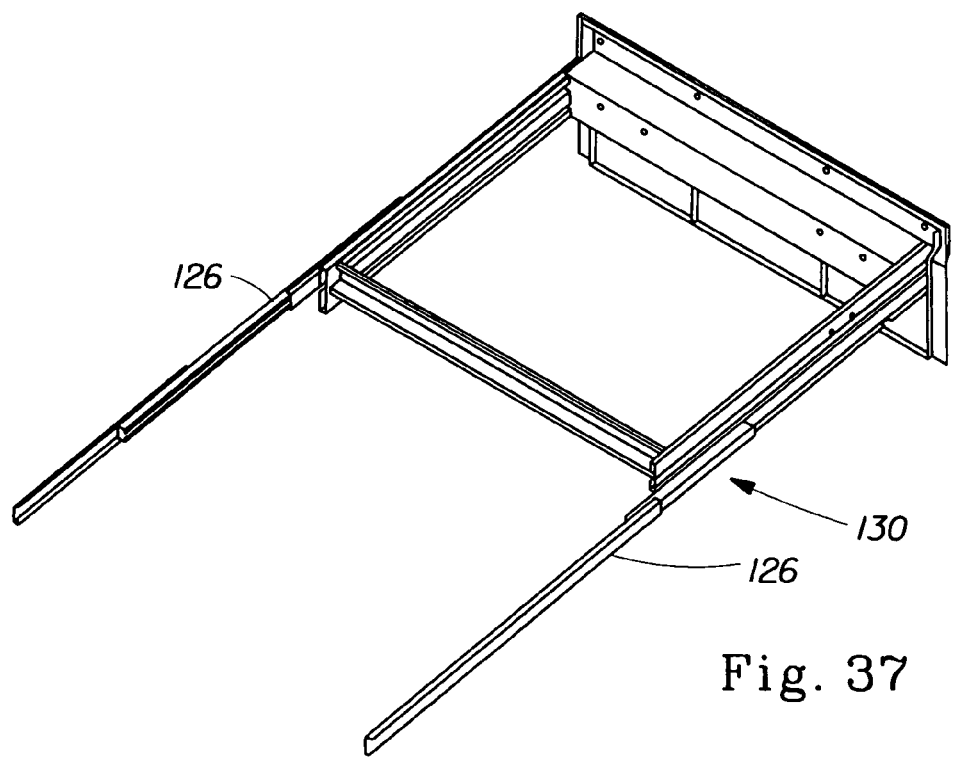
Figure 38:
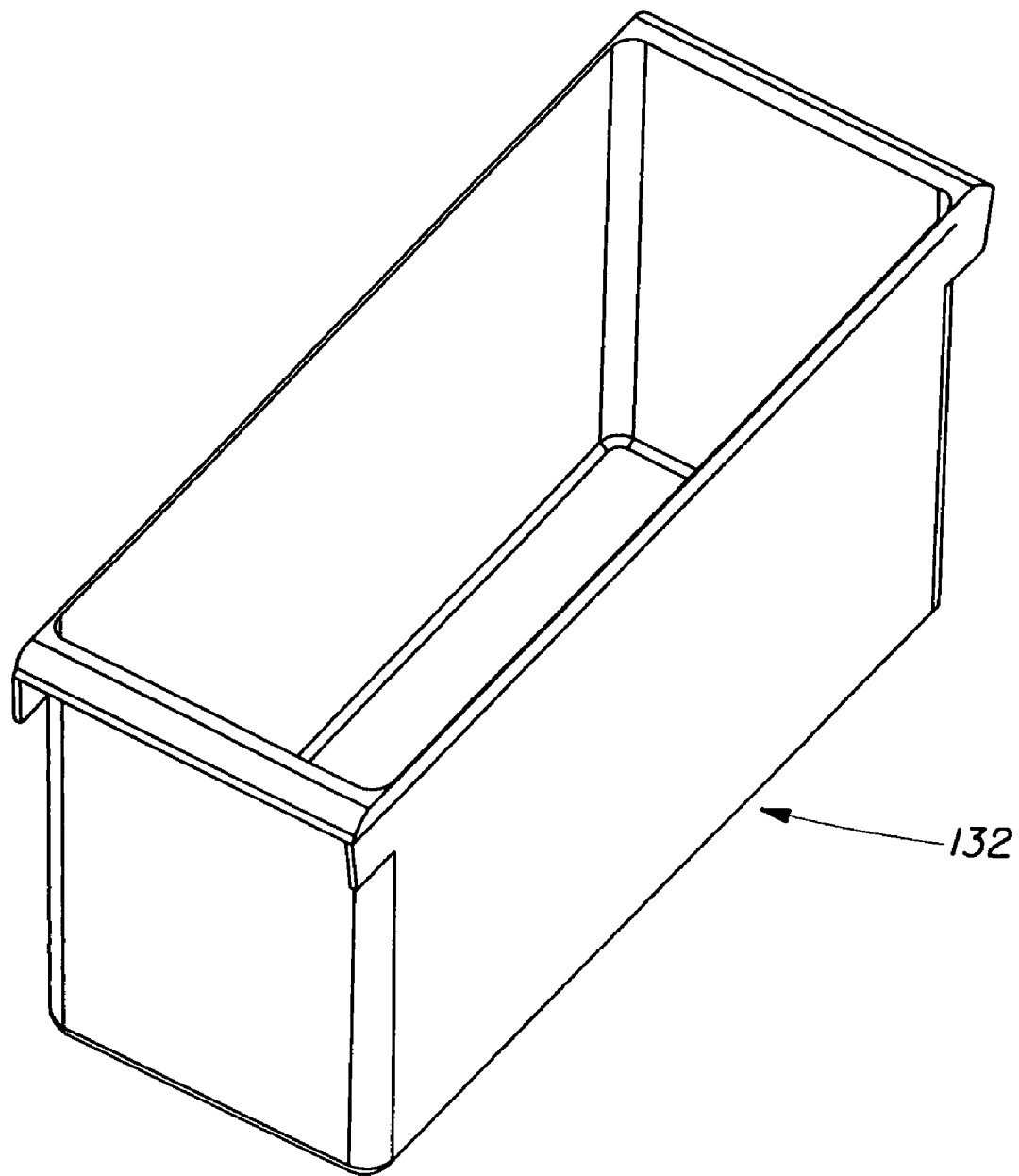
FIG. 38 is a perspective view of a punch card tub.

As shown in FIGS. 36 and 37, a drawer frame 130 that does not include a bottom panel can also be used in the present invention. Such drawer frame 130 includes only side walls from which a removable tub 132 can be suspended. Such drawer frames 130 are known in the art as punch card drawers. A punch card is defined as a plastic or paperboard frame, typically 6"×9", with blister packs covered with a foil seal for holding prescription medications. The drawer frames 130 allow tubs 132, usually filled with patient medications held in punch cards, to be easily inserted and removed from a drawer system 10 without the need for removing individual punch cards from the tub 132. See FIG. 38.

The drawers 20 can be made of any material that is lightweight, strong enough to withstand the required loads and will withstand exposure to chemicals and medicines. They can be made of metals, thermoplastics, or combinations thereof. It is preferable that the drawer body 122 be made of thermoplastic. It can be manufactured by any means known in the art including thermoforming, compression molding, injection molding, fabricating and combinations thereof. More preferably, the drawer body 122 is injection molded thermoplastic. It is most preferable that the drawer body 122 be manufactured of ABS. Preferably, the drawer slide 124 comprises an aluminum extrusion that is insert molded with a material that provides good wear characteristics as it slides on the drawer guide 82, preferably polypropylene.

Drawer bodies can be of varying heights and widths. The heights and widths should be selected so that drawers 20 can be utilized in various combinations. For example, the drawer system 10 can have numerous very shallow drawers 20, or one or two very deep drawers 20, or a combination of shallow and deep drawers 20. It is important that the overall stack-up of the drawer height for a given drawer system 10 configuration fit within the standard heights selected for the drawer systems 10. Drawer bodies can also be narrow or wide.

As shown in FIGS. 31–35, along each side of a drawer 20 and extending substantially the entire width of the drawer system 10 are the drawer slides 124. The drawer slides 124 extend beyond the depth of the drawer 20 to allow the drawer 20 to be slid to a completely open position without falling out of the drawer system 10. The drawer slides 124 are supported between the guide rails 82 of the drawer guide panels 18. It is important that the drawer slides 124 be disposed along the drawer 20 such that they are staggered with one drawer slide 124 being substantially one guide rail width higher than the other drawer slide 124. This allows for drawers 20 to be disposed along both sides of the drawer system 10. The staggered drawer slides 124 are further described in U.S. Pat. No. 4,822,116, Relyea et al, issued Apr. 18, 1989, incorporated herein by reference.

Figure 35:
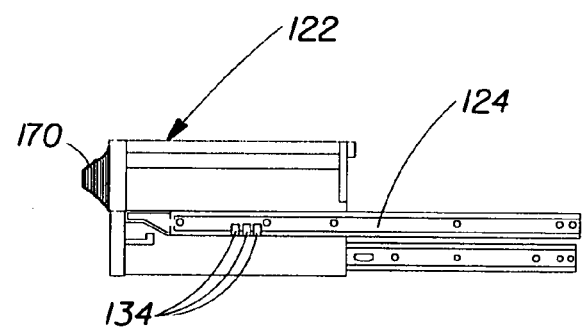
Figure 32:
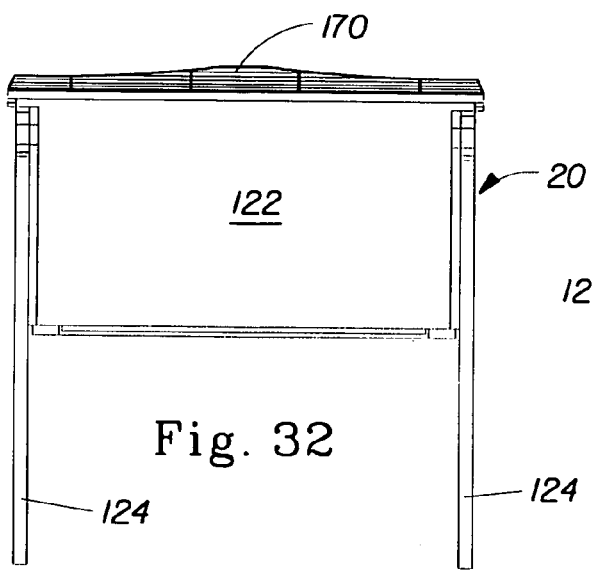
Figure 31:
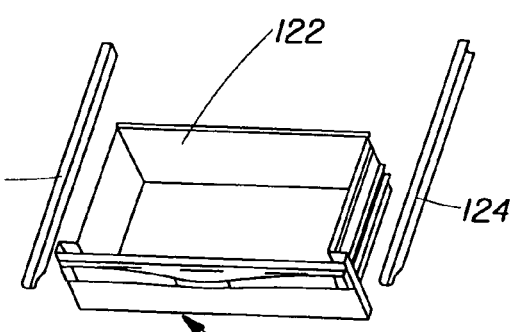

On the outer edge of each drawer slide 124 are capture mechanisms 134 for interfering with the locking tab 94, shown in FIG. 35. Preferably there are at least two and more preferably there are at least three such capture mechanisms 134, which allow the drawer 20 to be locked in any of three positions and to prevent a partially open drawer 20 from being opened further. Staggering the drawer slides 124 also allows any combination of drawers 20 to be stacked back to back with any other combination of drawers 20 on the other side of the drawer system 10, as more fully described in U.S. Pat. No. 4,822,116, Relyea et al, issued Apr. 18, 1989, incorporated herein by reference.

Figure 39:
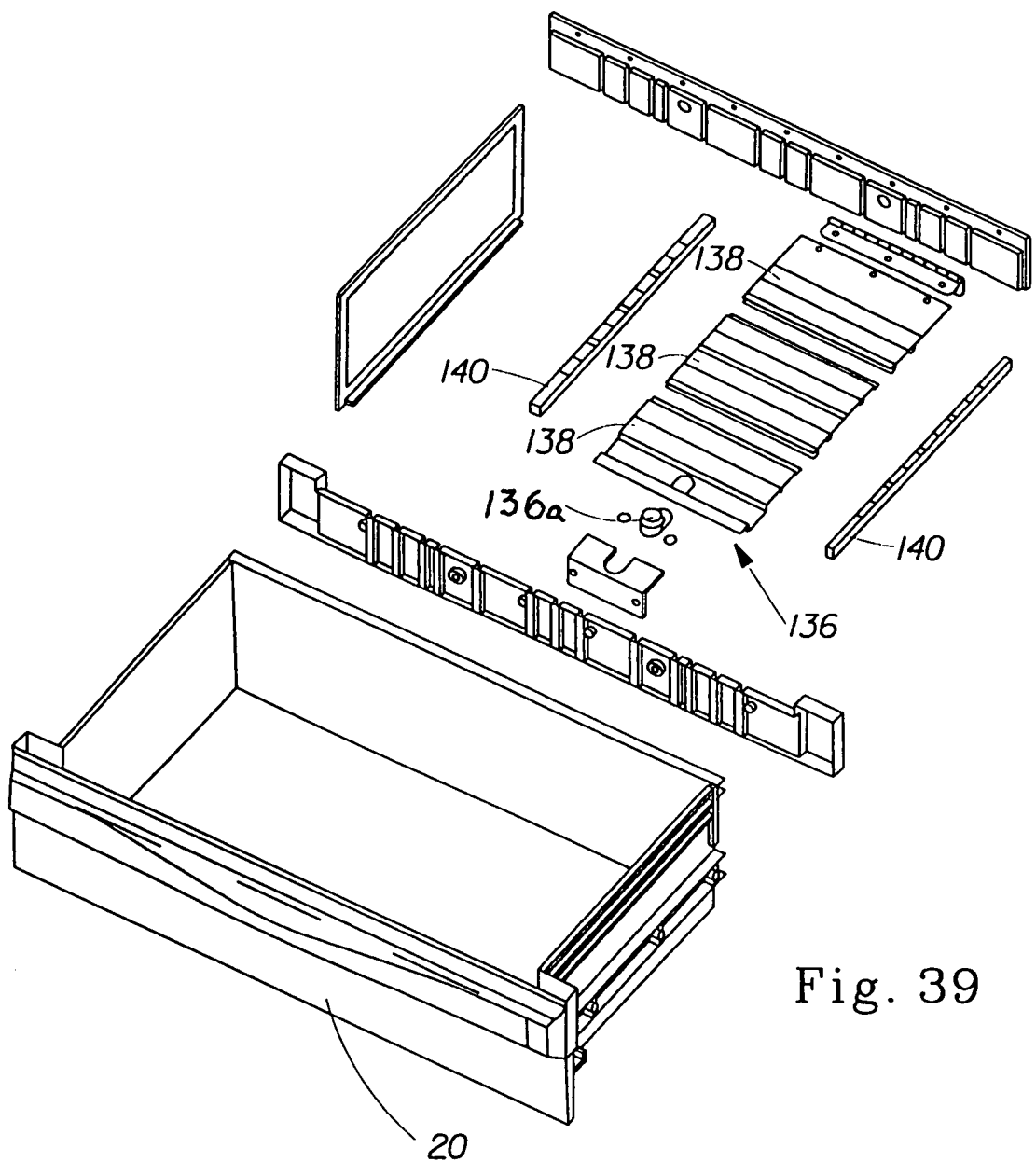

As illustrated by FIGS. 39 and 40, one or more drawers 20 of the drawer system 10 can be outfitted with a lockable lid 136. The lockable lid 136 can cover all of the drawer body 122 or a portion thereof. Such a lockable lid 136 is preferably made of a material that is able to provide a substantial deterrent to unauthorized access of the contents under the lockable lid 136. More preferably, it is made of metal. Most preferably, it is made from individual strips 138 of metal that are held in a lid frame 140. These individual strips 138 can be used for different sized drawers 20 to allow for standardized manufacturing. Preferably, the metal strips 138 are 6063-T6 aluminum extrusions and the lid frame 140 includes ABS side plates.

While the lockable lid 136 can be attached directly to the drawer body 122, it is preferably and removably attached to the drawer body 122 by means of a drawer divider plate 142. The drawer divider plate 142 preferably has attachment means, such as holes for receiving fasteners, for the lockable lid 136. The drawer divider plate 142 is itself attached to the drawer body 122 by attachment means, such as screws or rivets. Attaching the lockable lid 136 to the drawer divider plate 142 allows the lid to be moved to another drawer 20 if preferred merely by unfastening the drawer divider plate 142 from the drawer body 122.

The drawer divider plates 142, with or without a lockable lid 136 attached, also provide means for subdividing a drawer body 122 into compartments. They provide slots into which individual dividers can be arranged to create compartments within the drawer body 122.

The lockable lid 136 includes its own lock that is separate from the lock bar assembly 86. The drawer 20 in which the lockable lid 136 is included will still be locked by the lock bar assembly 86 when the drawer system 10 is locked. This lockable lid 136 provides additional security for particularly sensitive items, such as controlled substances. Any commercially available lock can be used, preferably a cam lock cylinder is utilized.

A drawer 20 with a lockable lid 136 preferably includes a means for preventing the removal of the drawer 20 from the drawer system 10 when the system is unlocked. Such means are well known in the art and can include a spring loaded tab attached to the drawer slide 124.

Figure 10:
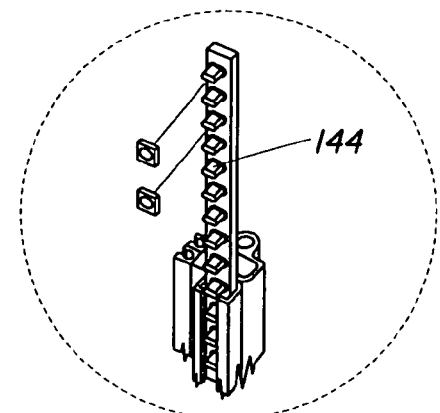
FIG. 10 is a exploded view of an accessory track.

An accessory track 144, see FIGS. 41 and 42, may be disposed along the length of the support columns 26 and is located so as to be accessible after the end panels 114 have been inserted, as shown in FIGS. 8 and 10. This accessory track 144 allows for the easy addition and removal of accessories to one or both ends of the drawer system 10. Preferably the accessory track 144 comprises a plurality of plastic inserts 146 that include a bolt hole 148 in the center and tabs 150 for capturing accessory bars 152 thereby providing at least two different types of attachment mechanisms. More preferably the accessory track 144 also includes more than one captured nut so that some accessories can be screwed into the accessory track 144 for more secure installation. It is most preferable that the accessory track 144 be colored so that it is more easily visible.

Figure 44:
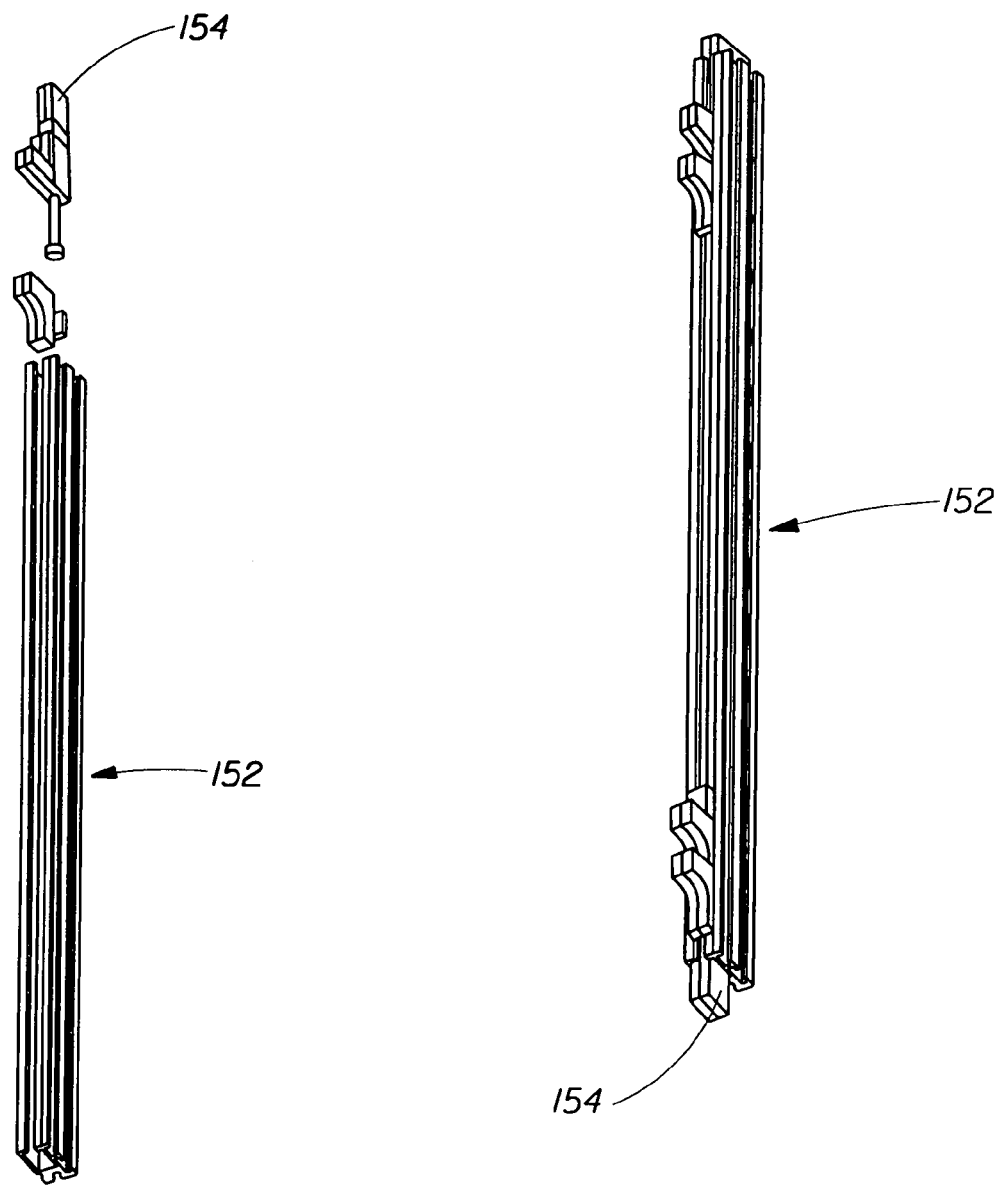
FIGS. 43 and 44 are exploded perspective and perspective views, respectively, of the accessory bar.
Figure 43:
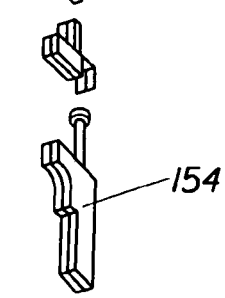

Accessories can be attached to the accessory track 144 by accessory bars 152. See FIGS. 3, 5 and 7. Preferably the accessory bar 152 comprises a spring loaded locking mechanism 154 that can be compressed to allow insertion of the locking mechanism 154 between the locking tabs 150 on the track 144 and then released so as to hold the locking mechanism 154 in place, shown in FIGS. 43 and 44. Such a locking mechanism is preferably made of injection molded plastic, however, it can also be made of metal. Accessories such as a refuse container 156 or a sharps container, are attached to the accessory bar 152 by any means known in the art. Preferably, such means comprises a telescoping holder 158 that allows the accessory to be extended away from the drawer system 10. Any sharps container well known in the art can be used including, but not limited to, those manufactured by Becton Dickinson and Company, Franklin Lakes, N.J.

Figure 7:
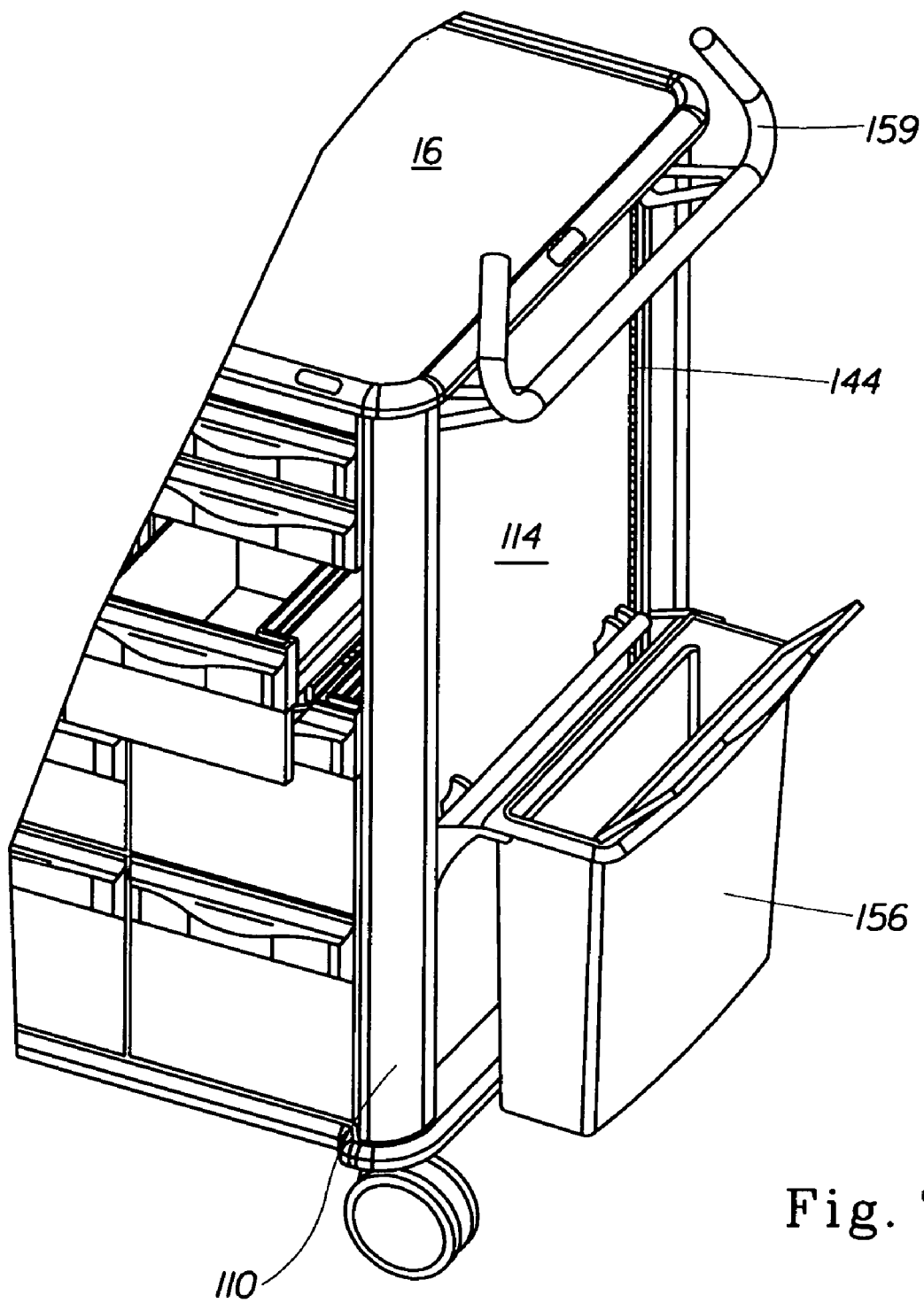
FIG. 7 is a fragmentary perspective view of a modular drawer system of the present invention with a refuse container and handles.
Figure 45:
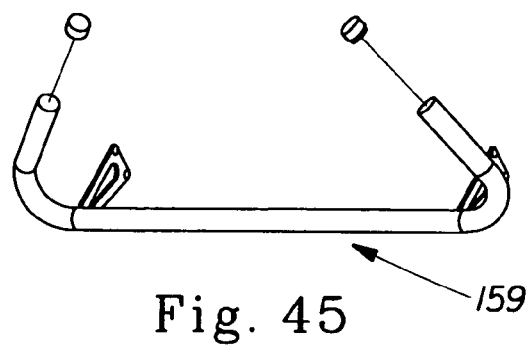
FIG. 45 is an exploded perspective view of a handle.

A handle 159, shown in FIGS. 7 and 45, for ease of steering and pushing the drawer system 10 can be bolted to the nuts contained in the accessory track 144. Such a handle 159 can be any configuration known in the art and is preferably attached by at least two bolts that screw into the nuts in the accessory track 144. Similarly, an additional shelf 160 for extension beyond the end of the drawer system 10 can be bolted to the accessory track 144. Such a shelf 160 can be made of any of the materials that can be used for the top 16. Preferably the tray is bolted with brackets to the nuts in the accessory track 144. More preferably nuts are provided at more than one height, and most preferably at four different heights, so that the shelf 160 and/or handle 159 can be located at more than one height, depending on customer preference. See FIGS. 1–4.

Figure 46:
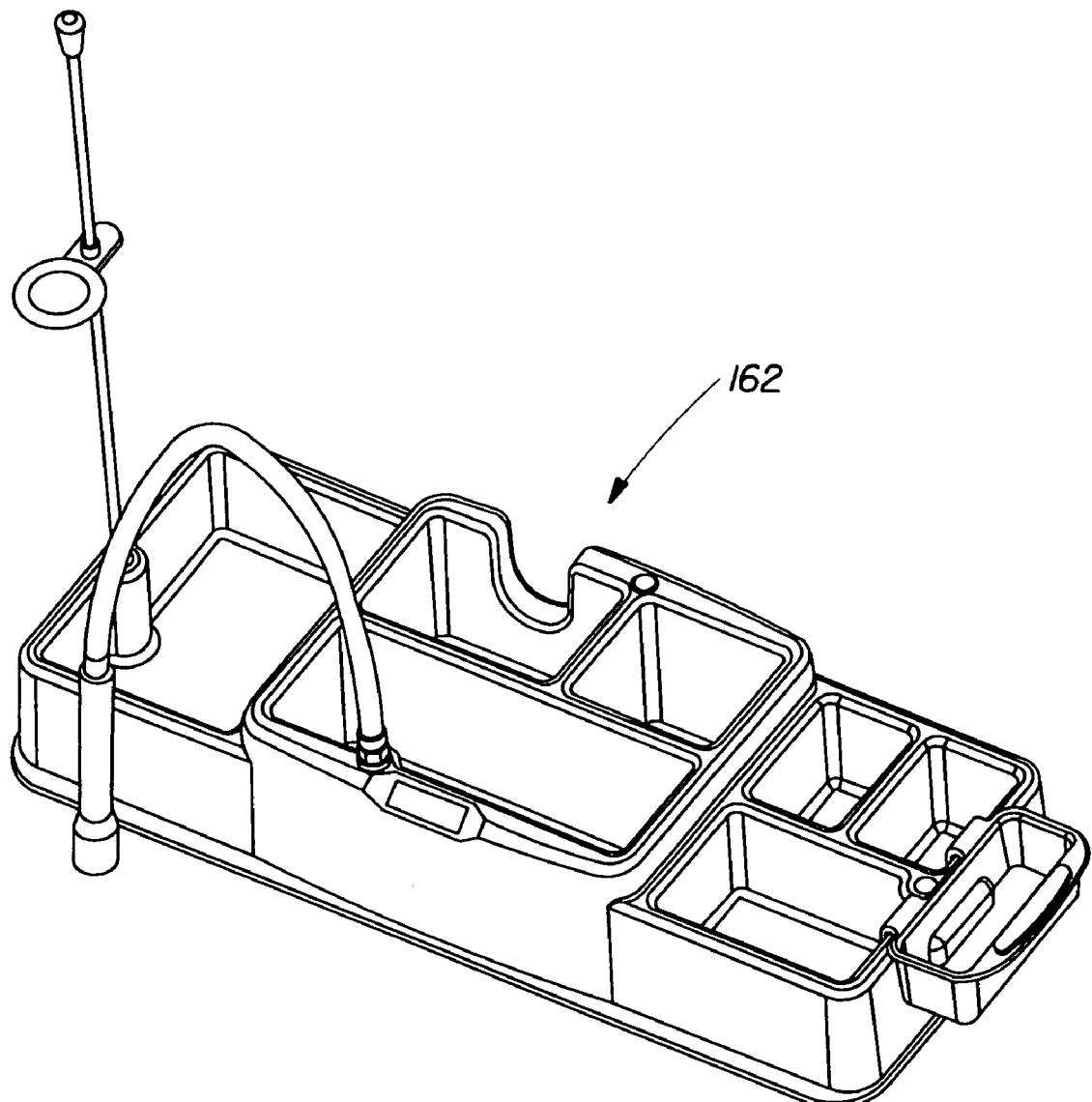
FIGS. 46 and 47 are perspective and exploded perspective views, respectively, of a cart top organizer.
Figure 47:
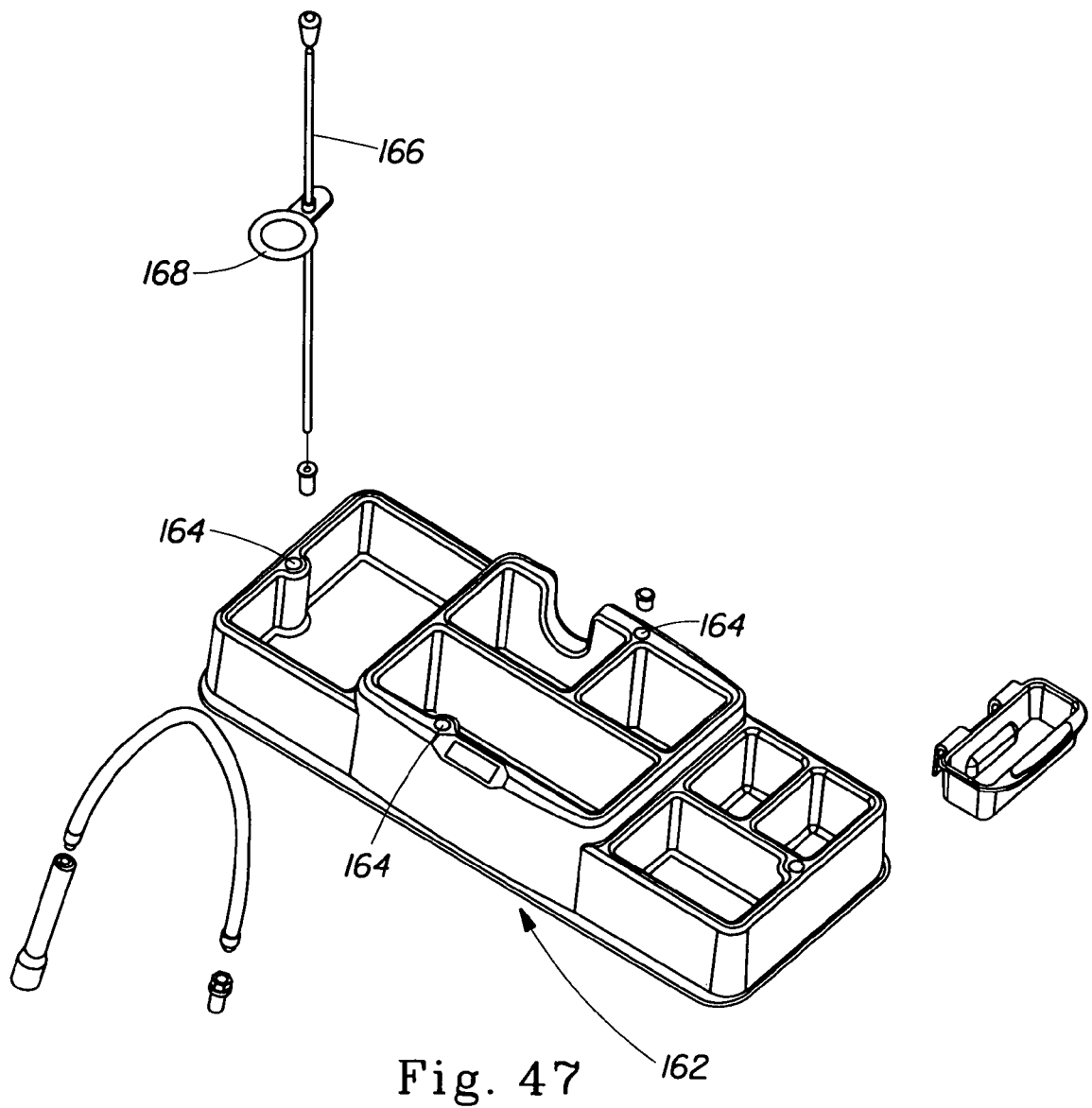

As shown in FIGS. 46 and 47, the drawer system 10 can further comprise a cart top organizer 162 that rests on the top 16 and can be used to store frequently used supplies. Such a cart top organizer 162 is preferably compartmentalized. It can be manufactured of any materials. Preferably, it is injection molded or thermoformed thermoplastic. Such a container preferably includes at least one recess 164 for holding items that extend above the cart top organizer 162, such as a stem 166 on which an eye level medication platform 168 can be located. Such a stem 166 has a slidably connected medication platform 168. This platform 168 can be located at the eye level of the individual dispensing the medication so that as liquid medication is poured into a dispensing cup, one can easily and accurately view the volume markings on the dispensing cup. Other recesses 164 can hold a work light, preferably such a work light has a movable arm to allow the light to be moved to where it is needed.

The drawer pulls 170 on each of the drawers 20 are preferably configured so that an operator is encouraged to pull the drawer 20 open from approximately the center of the drawer 20. See FIGS. 31 and 34. More preferably, the drawer pulls 170 provide an opening 172 for the insertion of an operator's finger that is larger and more protruded approximately in the center thereby encouraging the drawer 20 to be pulled from the center.

Figure 48:
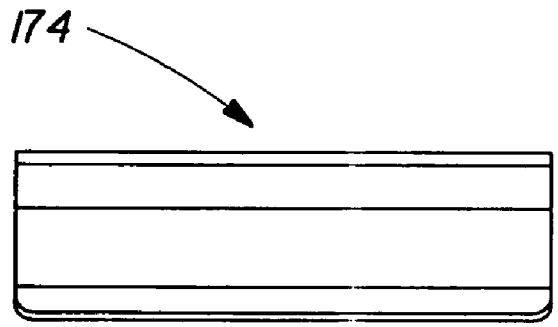
FIGS. 48, 49 and 50 are front elevational, side elevational and perspective views, respectively, of a label holder.
Figure 49:
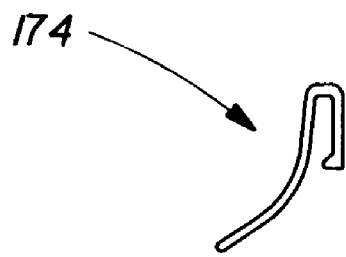
Figure 50:
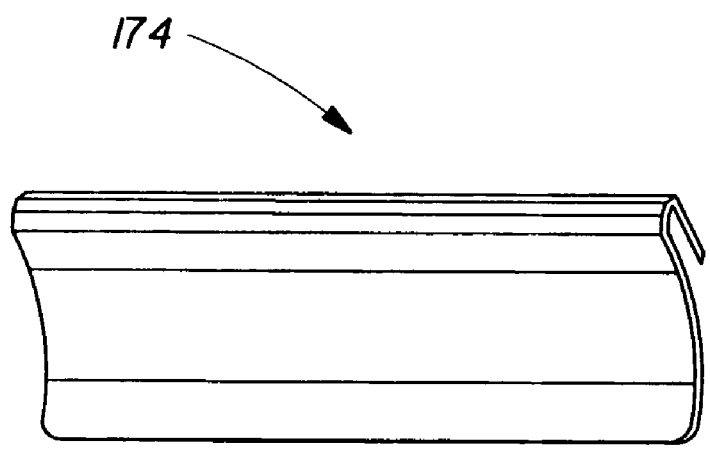

Labels can be removably attached to the face of the drawers 20, as shown in FIGS. 48–50. A label holder 174 encapsulates the label such that any liquids that are dripped on the cart will not get between the label holder and the label. Preferably the label holder 174 comprises a clear plastic sheet that has been bent into a configuration such that it follows the contour of the drawer 20 face, clips over the back of each drawer 20 face, and prevents liquids from dripping into the label and holds the label in place. More preferably, the label holders 174 are made of acrylic or polycarbonate.

Drawer systems 10 of the present invention can be any length and width and height. The length is dictated by the configuration of drawers 20. There can be one or more columns of drawers 20, limited only by the overall cart size that a customer is willing to accept. As noted previously, the combinations of drawer configurations are numerous and can be customized to meet each customer's requirements. The drawer system 10 can be stationary or it can be a rolling cart. Accessories can be attached on neither end, one end or both ends of the drawer system 10. The drawers 20 can be disposed along one or both sides of a drawer system 10.

What is claimed is:
1. A modular drawer system comprising:
a frame including a substantially rectangular base and at least four support columns extending from the base;
at least four corner column trim pieces, each being slidably connected to one of said support columns, said corner column trim pieces being separable from one another and individually removable;
a top attached to said frame;
at least one drawer bay including two drawer guide panels connected to said frame, at least one of said drawer panels being slidably connected to said frame by a corresponding one of said corner column trim pieces; and,
a plurality of drawers supported by at least one of said two drawer guide panels.

2. A modular drawer system in accordance with claim 1 further comprising:
at least two additional support columns disposed on either side of the length of said base and forming a plane that is perpendicular to the length of said base and,
at least one additional drawer guide panel slidably connected to said additional support columns, said additional drawer guide panel providing a first bay and a second bay.

3. A modular drawer system in accordance with claim 2 further comprising a side panel slidably connected to at least one of said support columns and covering at least one of said bays.

4. A modular drawer system in accordance with claim 1 further comprising at least four caster assemblies attached to said base.

5. A modular drawer system in accordance with claim 4 wherein each caster assembly comprises a caster with a mounting stem and at least one wheel.

6. A modular drawer system in accordance with claim 5 further comprising a bumper that surrounds said base and wherein at least one of said caster assemblies includes a means of attaching said bumper to said base.

7. A modular drawer system in accordance with claim 6 wherein said attaching means comprises said mounting stem and a perforation in said bumper, wherein said mounting stem is inserted through said perforation into said base, thereby attaching said bumper to said base.

8. A modular drawer system in accordance with claim 5 wherein at least one of said caster assemblies comprises two wheels that are disposed on either side of said caster assembly.

9. A modular drawer system in accordance with claim 5 further comprising a releasable tracking mechanism for preventing the caster of at least one caster assembly from rotating and aligning the at least one wheel of said caster assembly parallel to the direction of travel of said drawer system.

10. A modular drawer system in accordance with claim 9 wherein said releasable tracking mechanism comprises:
a foot pad for activating said tracking mechanism;
a locking plate, rotatably connected to said foot pad;
the caster of the at least one caster assembly; and,
means for releasably contacting the locking plate and the caster so as to prevent the rotation of the caster.

11. A modular drawer system in accordance with claim 10 wherein said releasable tracking mechanism prevents the rotation of two casters, wherein said two casters are located in a plane that is perpendicular to the direction of travel of said drawer system.

12. A modular drawer system in accordance with claim 9 further comprising a wheel lock on at least one of the caster assemblies.

13. A modular drawer system in accordance with claim 1 wherein said drawer guide panels each comprise at least two components.

14. A modular drawer system in accordance with claim 1, further comprising at least one lock bar assembly comprising a lock column, a lock bar which slides within said lock column, and at least one substantially horizontally flexible locking stem attached to said lock bar, said locking stem having a part attached thereto which engages at least one of said drawers.

15. A modular drawer system in accordance with claim 14 wherein said engaging part of said locking stem interferes with a capture mechanism disposed on said at least one of said drawers.

16. A modular drawer system in accordance with claim 14 wherein one of said drawer guide panels has at least one hole through which said engaging part of said locking stem extends to contact said at least one of said drawers.

17. A modular drawer system in accordance with claim 16 wherein said drawer guide panel has two sets of holes and wherein one set of holes is near one vertical edge of said drawer guide panel and the other set of holes is near the other vertical edge of said drawer guide panel.

18. A modular drawer system in accordance with claim 14 wherein said at least one of said drawers has at least one capture mechanism disposed thereon.

19. A modular drawer system in accordance with claim 18 wherein at least one of said drawers has a height, a first side with a first drawer slide disposed thereon, and a second side with a second drawer slide disposed thereon, said first and second drawer slides being disposed on said first and second sides at differing vertical levels relative to said height.

20. A modular drawer system in accordance with claim 1 further comprising a retractable means of providing information.

21. A modular drawer system in accordance with claim 1 wherein at least one end panel is slidably connected to two support columns.

22. A modular drawer system in accordance with claim 1 wherein said corner column trim pieces are extruded profiles with channels to slidably connect said support columns to said drawer guide panels.

23. A modular drawer system in accordance with claim 22 wherein said extruded profiles are polyvinyl chloride.

24. A modular drawer system in accordance with claim 1 wherein said plurality of drawers opens on one side of said drawer system only and further comprising a back panel slidably connected to said support columns.

25. A modular drawer system in accordance with claim 24 further comprising at least one drawer that extends the full width of the drawer system and wherein said drawer comprises at least one telescoping drawer slide that allows the drawer to be fully opened.

26. A modular drawer system in accordance with claim 1 further comprising at least two transverse support rods connecting the support columns disposed along a length of said frame.

27. A modular drawer system in accordance with claim 26 wherein said top is attached to said transverse support rods.

28. A modular drawer system in accordance with claim 1 wherein said top has reinforcing ribs and wherein said top is attached to said support columns.

29. A modular drawer system in accordance with claim 1 wherein at least one of said drawers has a height, a first side with a first drawer slide disclosed thereon, and a second side with a second drawer slide disposed thereon, said first and second drawer slides being disposed on said first and second sides at differing vertical levels relative to said height.

30. A modular drawer system in accordance with claim 1 wherein at least one of said drawers is adapted for receiving at least one interchangeable tub.

31. A modular drawer system in accordance with claim 1 wherein at least one of the plurality of drawers has a body and a lockable lid covering at least a portion of said body.

32. A modular drawer system in accordance with claim 31 wherein said lockable lid comprises at least two metal strips held together by a frame.

33. A modular drawer system in accordance with claim 1 having disposed thereon at least two opposing accessory tracks, said accessory tracks each having disposed thereon means for engaging and holding accessories.

34. A modular drawer system in accordance with claim 33 wherein said at least two opposing accessory tracks are each disposed along the length of one of said support columns.

35. A modular drawer system in accordance with claim 1 further comprising a cart top organizer.

36. A modular drawer system in accordance with claim 35 wherein said cart top organizer has at least one recess for holding an attachment.

37. A modular drawer system in accordance with claim 36 wherein said attachment comprises a stem with a slidably connected medication platform that can be adjusted to varying heights.

38. A modular drawer system in accordance with claim 1 wherein at least one of said plurality of drawers further comprises a drawer face, said drawer face having means for protectably and removably attaching labels to said drawer face.

39. A modular drawer system in accordance with claim 38 wherein said attaching means comprise a clear plastic sheet configured so as to follow the contour of said drawer face and prevent liquid from running between said attaching means and said face.

40. A modular drawer system in accordance with claim 1 wherein at least one of said plurality of drawers has a drawer pull that has an opening therein which is largest and most protruded approximately in the center of said at least one drawer.

41. A modular drawer system in accordance with claim 1, wherein each of said drawers includes a drawer face, said drawer system further comprising:
a label holder for removably attaching labels to said drawer face of one of said drawers, said label holder including a clear face portion and a lid portion connected to said face portion, said lid portion shaped to wrap over a top edge of said drawer face of said one of said drawers.

42. A modular drawer system in accordance with claim 1, wherein;
each of said corner column trim pieces extend continuously from said base to said top.

43. A modular drawer system in accordance with claim 1, wherein;
each of said corner column trim pieces is devoid of transversely extending seams.

44. A modular drawer system in accordance with claim 43, wherein;
each of said corner column trim pieces extend continuously from said base to said top.

45. A modular drawer system comprising:
a frame including a substantially rectangular base and at least four support columns extending from the base;
at least four corner column trim pieces, each being slidably connected to one of said support columns;
a top attached to said frame;
at least one drawer bay comprising two drawer guide panels slidably connected to said frame by said corner column trim pieces;
at least one drawer supported by said two drawer guide panels;
at least four caster assemblies attached to said base, wherein each caster assembly includes a caster with a mounting stem and at least one wheel;
a releasable tracking mechanism for preventing the caster of at least one caster assembly from rotating and for aligning the at least one wheel of said caster assembly parallel to the direction of travel of said drawer system, said releasable tracking mechanism including:
a foot pad for activating said tracking mechanism;
a locking plate rotatably connected to said foot pad;
the caster of the at least one caster assembly; and,
means for releasably contacting the locking plate and the caster so as to prevent the rotation of the caster, said contacting means including means for allowing the caster to rotate into a locked position after the tracking mechanism is engaged.

46. A modular drawer system in accordance with claim 45 wherein said allowing means comprises a detent with an angled approach.

47. A modular drawer system comprising:
a frame, comprising a substantially rectangular base and at least four support columns extending from the base;
at least four corner column trim pieces, each being slidably connected to one of said support columns;
a top, which is attached to said frame;
at least one drawer bay comprising two drawer guide panels which are slidably connected to said frame by said corner column trim pieces;
at least one drawer supported by said two drawer guide panels;
at least four caster assemblies attached to said base, wherein each caster assembly comprises:
a caster with a mounting stem and at least one wheel;
a releasable tracking mechanism for preventing the caster of at least one caster assembly from rotating and for aligning the at least one wheel of said caster assembly parallel to the direction of travel of said drawer system, said releasable tracking mechanism including:
a foot pad for activating said tracking mechanism;
a locking plate rotatably connected to said foot pad;
the caster of the at least one caster assembly;
a locking pin on said locking plate; and
a detent on said caster, said locking pin being movable for releasably contacting the detent on said caster so as to prevent the rotation of said caster.

48. A modular drawer system comprising:
a frame including a substantially rectangular base and at least four support columns extending from the base;
at least four corner column trim pieces, each being slidably connected to one of said support columns;
a top attached to said frame;
at least one drawer bay including two drawer guide panels connected to said frame, at least one of said drawer panels being slidably connected to said frame by a corresponding one of said corner column trim pieces; and,
a plurality of drawers supported by at least one of said two drawer guide panels; and
wherein said drawer guide panels each include two components that are screwed together, wherein each component is individually a 4 guide rail component or a 5 guide rail component.

49. A modular drawer system comprising:
a frame, comprising a substantially rectangular base and at least four support columns extending from the base;
at least four corner column trim pieces, each being slidably connected to one of said support columns;
a top, which is attached to said frame;
at least one drawer bay comprising two drawer guide panels which are slidably connected to said frame by said corner column trim pieces;
at least one drawer supported by said two drawer guide panels;
at least one lock bar assembly located within said drawer system such that it can lock and unlock a plurality of drawers on one side of said drawer system, said at least one lock bar assembly being attached to one of said drawer guide panels, said lock bar assembly including a lock column, a locking platform attached to the top of the lock column, a lock cam that is housed in said locking platform, and at least one lock bar including a locking stem that can flex in one direction and a locking tab that interferes with a capture mechanism on a drawer slide for locking said at least one drawer and for allowing said at least one drawer to close if it is open when the lock bar assembly is activated.

50. A modular drawer system in accordance with claim 49 wherein said lock cam and said lock platform are made of different materials.

51. A modular drawer system in accordance with claim 49 wherein said lock bar assembly further comprises a lock that is flexibly connected to the lock cam.

52. A modular drawer system in accordance with claim 51 wherein said lock is a plunger type lock.

53. A modular drawer system in accordance with claim 51 wherein said lock is contained in a lock tray.

54. A modular drawer system in accordance with claim 53 wherein said flexible connection means further connects said lock tray to said drawer system.

55. A modular drawer system in accordance with claim 54 wherein said flexible connection means comprises a cable assembly.

56. A modular drawer system in accordance with claim 55 wherein said cable assembly comprises a wire and a conduit.

57. A modular drawer system in accordance with claim 53 wherein said lock tray includes two drawer slides that are inserted between the drawer guide panels.

58. A modular drawer system in accordance with claim 53 wherein said lock tray has an underside, and wherein said lock tray can be removed from the drawer system only by accessing said underside.

59. A modular drawer system in accordance with claim 51 wherein said lock is locked and unlocked by mechanical key means or by electronic means.

60. A modular drawer system in accordance with claim 53 wherein said lock tray further comprises a retractable means of providing information.

61. A modular drawer system comprising:
a frame including a substantially rectangular base and at least four support columns extending from the base;
at least four corner column trim pieces, each being slidably connected to one of said support columns;
a top attached to said frame;
at least one drawer bay comprising two drawer guide panels slidably connected to said frame by said corner column trim pieces;
a drawer supported by said two drawer guide panels, said drawer having a drawer body and a lockable lid covering at least a portion of said drawer body, wherein said lockable lid includes at least two metal strips held together by a frame, said lockable lid being removably attached to a drawer divider plate and said drawer divider plate being removably attached to said drawer body.

62. A modular drawer system comprising:
a frame including a substantially rectangular base and at least four support columns extending from the base;
at least four corner column trim pieces, each being slidably connected to one of said support columns;
a top attached to said frame;
at least one drawer bay including two drawer guide panels slidably connected to said frame by said corner column trim pieces;
at least one drawer supported by said two drawer guide panels;
at least two opposing accessory tracks disposed along the length of said support columns, said at least two opposing accessory tracks each having a first attachment means and a second attachment means disposed thereon for attaching accessories to said accessory tracks, said first attachment means including tabs and said second attachment means including at least one pair of nuts.

63. A modular drawer system in accordance with claim 62 further comprising an accessory bar for attaching accessories to said drawer system, wherein said accessory bar comprises a spring loaded locking mechanism.

64. A modular drawer system in accordance with claim 62 further comprising a handle that is bolted to said nuts of said second attachment means.

65. A modular drawer system in accordance with claim 62 wherein said second attachment means comprises at least four pairs of nuts, wherein each pair is located at a different vertical location along the accessory track and further comprising a shelf that can be bolted to any one of said four pairs of nuts, thereby providing four different heights for said shelf.

66. A lock bar assembly for locking a plurality of drawers, comprising a lock column, a lock bar which slides within the lock column, a locking platform disposed at a top of said lock column, and a substantially horizontally flexible locking stem attached to said lock bar, said locking platform including a wedge shaped lock cam, said lock cam being operatively effective for moving said column down, said locking stem having a part attached thereto for engaging a drawer.

67. A lock tray comprising:
a tray;
a lock contained within said tray;
means for locking a device;
means for holding the tray in the device;
means for connecting the lock to said locking means; and
means for flexibly connecting said tray to the device.

68. A modular drawer system comprising:
a frame, comprising a substantially rectangular base and at least four support columns extending from the base;
at least four corner column trim pieces, each being slidably connected to one of said support columns;
a top, which is attached to said frame;
at least one drawer bay comprising two drawer guide panels which are slidably connected to said frame by said corner column trim pieces;
a plurality of drawers supported by said two drawer guide panels, at least one of said drawers having a body and at least one of said drawers having a face;
a plurality of caster assemblies attached to said system;

a releasable tracking mechanism comprising:
a means for activating said tracking mechanism;
a means for preventing at least one of said caster assemblies from rotating about a vertical axis while allowing said at least one caster assembly to rotate about a horizontal axis; and,
a means for connecting said activating means to said preventing means;
a lock bar assembly for locking a plurality of drawers comprising a lock column, a lock bar which slides within the lock column, and a means for allowing an open drawer to be closed, while locking a closed drawer, when the lock bar assembly is activated;
a lock tray comprising:
a tray;
a lock contained within said tray; and
means for connecting the lock to said lock bar assembly;
a lockable lid covering at least a portion of said at least one drawer body comprising:
a lid and a means for removably attaching said lid to said at least one drawer body wherein said means and lid is interchangeable with other similarly sized drawers;
an apparatus for attaching accessories to said system, comprising:
at least two opposing accessory tracks; and,
an accessory bar;
wherein said at least two accessory tracks comprise more than one means for attaching accessories, and wherein said accessory bar comprises means for detachably connecting accessories to said accessory tracks;
an adjustable liquid dispensing platform comprising:
a support mounted on said system;
a stem held by said support; and
a platform slidably connected to said stem;
a drawer pull that encourages one to pull at least one of said drawers open from the center of said at least one drawer, comprising a drawer pull with an opening approximately in the center of said at least one drawer that is larger and more protruded than the opening along the balance of the length of the drawer pull; and,
a clear label holder for removably attaching labels to said at least one drawer face and for preventing spilled liquid from running between said drawer face and the label holder comprising a lip that clips over said drawer face and is contoured to substantially match the contour of said drawer face closely enough so that a label will be held between the label holder and said drawer face.

* * * * *